(12) United States Patent
Oshitani et al.

(10) Patent No.: US 10,500,925 B2
(45) Date of Patent: Dec. 10, 2019

(54) REFRIGERATION CYCLE DEVICE

(71) Applicant: DENSO CORPORATION, Kariya, Aichi-pref. (JP)

(72) Inventors: Hiroshi Oshitani, Kariya (JP); Akane Muto, Kariya (JP); Tatsuhiro Suzuki, Kariya (JP); Teruyuki Hotta, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/218,937

(22) Filed: Dec. 13, 2018

(65) Prior Publication Data

US 2019/0111764 A1    Apr. 18, 2019

Related U.S. Application Data

(63) Continuation of application No. PCT/JP2017/017511, filed on May 9, 2017.

(30) Foreign Application Priority Data

Jun. 16, 2016  (JP) .................................. 2016-119882
Feb. 17, 2017  (JP) .................................. 2017-027596

(51) Int. Cl.
*B60H 1/32* (2006.01)
*B60H 1/00* (2006.01)

(52) U.S. Cl.
CPC ......... *B60H 1/323* (2013.01); *B60H 1/00485* (2013.01); *B60H 1/00814* (2013.01);
(Continued)

(58) Field of Classification Search
CPC .............................. F25B 41/00; F25B 41/067; F25B 2341/0011; F25B 2341/0012; F25B 1/00;
(Continued)

(56) References Cited

U.S. PATENT DOCUMENTS

| | | | | |
|---|---|---|---|---|
| 5,343,711 A | * | 9/1994 | Kornhauser | F25B 1/06 417/198 |
| 6,606,873 B2 | * | 8/2003 | Takeuchi | B60H 1/3204 62/191 |

(Continued)

FOREIGN PATENT DOCUMENTS

| | | |
|---|---|---|
| JP | S61280353 A | 12/1986 |
| JP | 3931899 B2 | 6/2007 |
| JP | 2009162444 A | 7/2009 |

*Primary Examiner* — Emmanuel E Duke
(74) *Attorney, Agent, or Firm* — Harness, Dickey & Pierce, P.L.C.

(57) ABSTRACT

A refrigeration cycle device includes a compressor, a first branch portion, a radiator, a second branch portion, a first decompressor, a first evaporator, a second decompressor, a second evaporator, and an ejector. The first branch portion divides a flow of a refrigerant discharged from the compressor into one flow and an other flow. The radiator radiates heat of the refrigerant of the one flow. The second branch portion divides a flow of the refrigerant from the radiator into one flow and an other flow. The first decompressor decompresses the refrigerant of the one flow divided in the second branch portion. The second decompressor decompresses the refrigerant of the other flow divided in the second branch portion. A nozzle of the ejector decompresses and injects the refrigerant of the other flow divided in the first branch portion. The refrigerant suction port draws the refrigerant from the second evaporator.

14 Claims, 12 Drawing Sheets

(52) U.S. Cl.
CPC ......... *B60H 1/3227* (2013.01); *B60H 1/3229* (2013.01); *B60H 2001/3298* (2013.01)

(58) Field of Classification Search
CPC .... F25B 1/06; F25B 13/00; F25B 5/00; F25B 9/008; B60H 1/323; B60H 1/00814; B60H 1/3229; B60H 1/00485; B60H 1/3227; B60H 2001/3298; B60H 1/32; B60H 1/3204; B60H 1/3211
See application file for complete search history.

(56) References Cited

U.S. PATENT DOCUMENTS

| | | | |
|---|---|---|---|
| 6,698,221 B1* | 3/2004 | You | F25B 41/00 62/196.4 |
| 2005/0178150 A1 | 8/2005 | Oshitani et al. | |
| 2005/0268644 A1 | 12/2005 | Oshitani et al. | |
| 2007/0119207 A1* | 5/2007 | Oshitani | F25B 5/00 62/500 |
| 2008/0034786 A1* | 2/2008 | Oshitani | F25B 41/00 62/500 |
| 2016/0280041 A1* | 9/2016 | Suzuki | B60H 1/00921 |

* cited by examiner

AIR-CONDITIONING AND REFRIGERATING OPERATION

AIR CONDITIONING OPERATION

REFRIGERATION CYCLE DEVICE

CROSS REFERENCE TO RELATED APPLICATIONS

The present application is a continuation application of International Patent Application No. PCT/JP2017/017511 filed on May 9, 2017, which designated the U.S. and claims the benefit of priority from Japanese Patent Application No. 2016-119882 filed on Jun. 16, 2016 and Japanese Patent Application No. 2017-027596 filed on Feb. 17, 2017.

TECHNICAL FIELD

The present disclosure relates to a refrigeration cycle device including an ejector.

BACKGROUND ART

Refrigeration cycle devices for vehicles are configured to perform a cooling operation for a passenger cabin and a cooling operation for a refrigerator. Such refrigeration cycle device includes a plurality or evaporators and a plurality of decompressors.

SUMMARY OF INVENTION

This section provides a general summary of the present disclosure, and is not a comprehensive disclosure of its full scope or all of its features.

In an aspect of the present disclosure, a refrigeration cycle device includes a compressor, a first branch portion, a radiator, a second branch portion, a first decompressor, a first evaporator, a second decompressor, a second evaporator, an ejector, and a merging part.

The compressor draws a refrigerant and discharges the refrigerant after compressing the refrigerant. The first branch portion divides a flow of the refrigerant discharged from the compressor into one flow and an other flow of the refrigerant. The radiator allows the refrigerant of the one flow divided in the first branch portion to radiate heat in the radiator. The second branch portion divides a flow of the refrigerant, which flows from the radiator after radiating heat, into one flow and an other flow of the refrigerant. The first decompressor decompresses the refrigerant of the one flow divided in the second branch portion. The first evaporator allows the refrigerant, which flows from the first decompressor after being decompressed in the first decompressor, to absorb heat and to be evaporated in the first evaporator. The second decompressor decompresses the refrigerant of the other flow divided in the second branch portion. The second evaporator allows the refrigerant, which flows from the second decompressor after being decompressed in the second decompressor, to absorb heat and to be evaporated in the second evaporator.

The ejector includes a nozzle, a refrigerant suction port, and a pressure increasing portion. The nozzle decompresses and injects the refrigerant of the other flow divided in the first branch portion. The nozzle injects the refrigerant as an injection refrigerant. The refrigerant suction port draws the refrigerant, which flows from the second evaporator after being evaporated in the second evaporator, using suction force of the injection refrigerant. The refrigerant suction port draws the refrigerant as a suction refrigerant. The pressure increasing portion mixes the injection refrigerant and the suction refrigerant to be a mixed refrigerant and increases a pressure of the mixed refrigerant. The merging part collects the refrigerant flowing out of the first evaporator and the mixed refrigerant flowing from the pressure increasing portion after the pressure of which is increased in the pressure increasing portion.

BRIEF DESCRIPTION OF DRAWINGS

The above and other objects, features and advantages of the present disclosure will become more apparent from the following detailed description referring to the drawings described herein.

EMBODIMENTS FOR CARRYING OUT INVENTION

Figure 1:
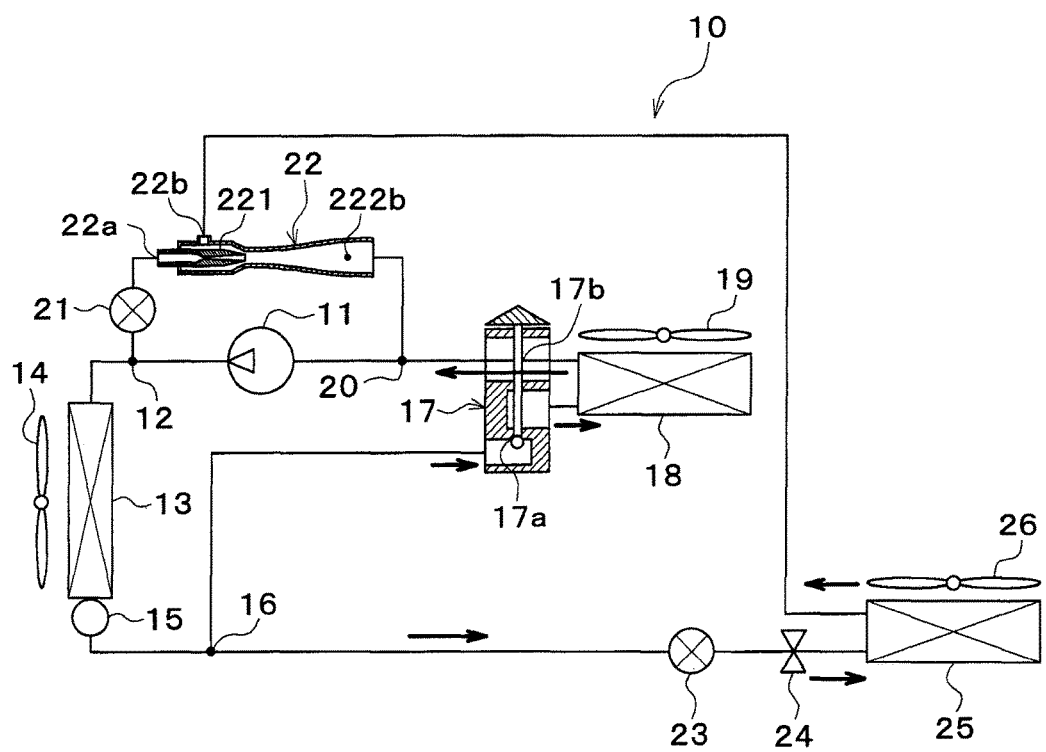
FIG. 1 is a diagram schematically illustrating an overall configuration of a refrigeration cycle device and showing flows of refrigerant in an air-conditioning and refrigerating operation in a first embodiment.

Refrigeration cycle devices for vehicles are configured to perform a cooling operation for a passenger cabin and a cooling operation for a refrigerator. For performing the cooling operations for the passenger cabin and the refrigerator, such refrigeration cycle device includes a plurality of decompressor, a plurality of evaporators, a flow-rate control valve, and a timer circuit. The plurality of decompressor may include a cooling decompressor for performing the cooling operation for the passenger cabin and a refrigerator decompressor for performing the cooling operation for the refrigerator. The plurality of evaporators may include a cooling evaporator for performing the cooling operation for the passenger cabin and a refrigerator evaporator for performing the cooling operation for the refrigerator.

Each of the cooling decompressor and the refrigerator decompressor reduces a pressure of refrigerant condensed in a condenser. The refrigerant decompressed in the cooing decompressor flows into the cooling evaporator. The cooling evaporator evaporates the refrigerant to cool air flowing toward the passenger cabin. The refrigerant decompressed in the refrigerator decompressor flows into the refrigerator evaporator. The refrigerator evaporator evaporates the refrigerant to cool an inside of the refrigerator evaporator.

The refrigerator decompressor and the refrigerator evaporator are arranged in parallel with the cooling decompressor and the cooling evaporator respectively along a flow direction of the refrigerant.

The flow-rate control valve is an electric control valve. The flow-rate control valve is configured to reduce a flow rate of the refrigerant flowing to the cooling decompressor and the refrigerator evaporator. Additionally or alternatively, the flow-rate control valve is configured to shut off a flow of the refrigerant flowing to the cooling decompressor and the refrigerator evaporator. More specifically, the flow-rate control valve, when being closed, is configured to reduce a flow rate of the refrigerant flowing through a refrigerant tube connected to the cooling decompressor or to shut off a flow of the refrigerant flowing through the refrigerant tube toward the cooling decompressor. The flow-rate control valve is opened and closed alternately in response to signals output from the timer circuit so that the flow-rate control valve is opened and closed repeatedly at regular intervals.

When the flow-rate control valve is closed in response to the signal output from the timer circuit, a volume of the refrigerant drawn into a compressor decreases rapidly. As a result, a suction pressure of the compressor falls rapidly. As such, an evaporator pressure at which the refrigerant evaporates in the refrigerator evaporator falls rapidly. Therefore, the inside of the refrigerator can be cooled regardless of a cooling state of the passenger cabin.

As described above, since the flow-rate control valve is opened and closed alternately at regular intervals, both of the cooling operation for the passenger cabin and the cooling operation for the refrigerator can be performed. However, a pressure of the refrigerant may vary drastically by opening and closing the flow-rate control valve repeatedly. As a result, it may not be able to apply comfortability to a passenger in the air conditioning stably or comfortability applied to the passenger in the air conditioning may deteriorate.

The present disclosure is unique and innovative to suppress a cause of such variation in a pressure of refrigerant with a refrigeration cycle device including two or more evaporators configured to evaporate the refrigerant in different temperature ranges respectively.

Embodiments in the present disclosure will be described hereinafter referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above.

First Embodiment

A refrigeration cycle device 10 shown in FIG. 1 is mounted to an air conditioner for a vehicle and is configured to cool air flowing toward a passenger cabin. An inside of the passenger cabin is an air-conditioning object space of the air conditioner for a vehicle. The air flowing toward the passenger cabin is an object fluid to be cooled by the refrigeration cycle device 10.

In the present embodiment, the refrigerant circulating in the refrigeration cycle device 10 is an HFO-based refrigerant (specifically, R1234yf). The refrigeration cycle device 10 provides a subcritical refrigeration circuit in which a pressure of the refrigerant on a high-pressure side does not exceed a pressure of the refrigerant on a low-pressure side. The refrigerant may be an HFC-based refrigerant (specifically, R134a).

The refrigerant is mixed with refrigerator oil serving as a lubricant oil of a compressor 11, and the refrigerator oil partially circulates in the cycle together with the refrigerant.

In the refrigeration cycle device 10, the compressor 11 draws the refrigerant, compresses the refrigerant to be the refrigerant at a high pressure, and discharges the refrigerant at the high pressure. Specifically, the compressor 11 is an electric compressor that houses a fixed displacement type compression mechanism and an electric motor that drives the compression mechanism in a single housing. The compressor 11 is disposed inside an engine room.

Various compression mechanisms such as a scroll type compression mechanism and a vane type compression mechanism may be adopted as the compression mechanism of the compressor 11. In addition, the operation (i.e., rotational speed) of the electric motor is controlled by a control signal output from a controller (not shown), and either an AC motor or a DC motor may be adopted as the electric motor.

Alternatively, the compressor 11 may be of an engine driven type and is driven by rotational driving force output from the engine for the vehicle via a pulley, a belt, and the like. Various compressors such as a variable capacity compressor and a fixed capacity compressor may be adopted as the compressor driven by the engine. A refrigerant discharge performance of the variable capacity compressor is controlled by changing a volume of the refrigerant discharged from the variable capacity compressor. A refrigerant discharge performance of the fixed capacity compressor is controlled by changing operation rates of the fixed capacity compressor. The operation rates are changed by turning on and off an electromagnetic clutch.

The compressor 11 includes a suction port connected to a refrigerant inlet port of a first branch portion 12. The first branch portion 12 divides a flow of the refrigerant discharged from the compressor 11 into one flow and an other flow of the refrigerant. The first branch portion 12 is configured by a three-way joint including three ports. The three ports include one refrigerant inlet port and two refrigerant outlet ports. As an example, the three-way joint may be formed by assembling pipes having different diameters respectively by a method such as welding. Alternatively, the three-way joint may be formed by a metal block or a resin block defining refrigerant passages therein.

One of the two refrigerant outlet ports of the first branch portion 12 is a first refrigerant outlet port connected to a radiator 13. The other one of the two refrigerant outlet ports of the first branch portion 12 is a second refrigerant inlet connected to an ejector 22 as described later.

The radiator 13 is a heat-dissipating heat exchanger and is configured to radiate heat of the refrigerant at the high pressure. The radiator 13 cools the refrigerant at the high pressure by radiating the heat of the refrigerant at the high pressure. More specifically, the radiator 13 performs a heat exchange between the refrigerant at the high pressure discharged from the compressor 11 and outside air to cool the refrigerant at the high pressure. The outside air is air taken in from outside of the passenger cabin and discharged by an exterior blower 14.

The radiator 13 and the exterior blower 14 are disposed in a front area inside the engine room. The exterior blower 14 is an electric blower of which rotational speed (i.e., a volume of air discharged from the electric blower) is controlled based on a control voltage output from the controller.

The radiator 13 includes a refrigerant outlet connected to a reservoir 15. The refrigerant after radiating heat in the radiator 13 flows into the reservoir 15. The reservoir 15 serves as a high-pressure-side gas-liquid separator. Specifically, the reservoir 15 divides the refrigerant from the radiator 13 into a gas refrigerant and a liquid refrigerant, stores an excess refrigerant, and discharges the liquid refrigerant. The reservoir 15 is disposed in the engine room.

The reservoir 15 includes a refrigerant outlet connected to a second branch portion 16. The liquid refrigerant discharged from the reservoir 15 flows into the second branch portion 16.

The second branch portion 16 is configured by a three-way joint including three ports. The three ports include one refrigerant inlet port and two refrigerant outlet ports. As an example, the three-way joint may be formed by assembling pipes having different diameters respectively by a method such as welding. Alternatively, the three-way joint may be formed by a metal block or a resin block defining refrigerant passages therein.

The refrigerant inlet port of the second branch portion 16 is connected to the reservoir 15 and takes in the liquid refrigerant discharged from the reservoir 15. The second branch portion 16 divides a flow of the refrigerant from the reservoir 15 into one flow and an other flow.

One of the two refrigerant outlet ports of the second branch portion 16 is a first refrigerant outlet port connected to a cooling evaporator 18 serving as a first evaporator via an expansion valve 17 serving as a first decompressor. The refrigerant of the one flow divided in the second branch portion 16 flows out of the second branch portion 16 from the first refrigerant outlet port and flows to the expansion valve 17.

The other one of the two refrigerant outlet ports of the second branch portion 16 is a second refrigerant outlet port connected to a refrigerator evaporator 25 serving as a second evaporator via a fixed throttle 24 serving as a second decompressor. The refrigerant of the other flow divided in the second branch portion 16 flows out of the second branch portion 16 from the second refrigerant outlet port and flows to the refrigerator evaporator 25.

The expansion valve 17 reduces a pressure of refrigerant flowing therethrough and expands the refrigerant. The expansion valve 17 may be configured by a thermosensitive expansion valve that defines a fluid passage therein allowing a fluid to flow therethrough and that includes a mechanical mechanism configured to adjust a passage cross-sectional area (i.e., a throttle degree) of the fluid passage. In the present embodiment, the mechanical mechanism adjusts a degree of superheat of refrigerant in a refrigerant outlet of the expansion valve 17 to be maintained within a specified range.

The expansion valve 17 defines a decompression path 17a and a thermosensitive path 17b therein. The decompression path 17a is located between the first refrigerant outlet port of the second branch portion 16 and the cooling evaporator 18. As such, refrigerant flowing out of the reservoir 15 flows into the decompression path 17a. The decompression path 17a decompress, i.e., reduces a pressure of, the refrigerant to be the refrigerant at a low pressure and discharges the refrigerant at the low pressure toward the cooling evaporator 18.[0034]

The cooling evaporator 18 is a heat-absorbing heat exchanger and evaporates the refrigerant at the low pressure flowing from the decompression path 17a. Specifically, the cooling evaporator 18 performs a heat exchange between the refrigerant at the low pressure from the decompression path 17a and air flowing toward the passenger cabin. The low-refrigerant from the decompression path 17a absorbs heat from the air in the heat exchange and is evaporated. As a result, the cooling evaporator 18 cools the air flowing toward the passenger cabin by absorbing heat from the air using the refrigerant at the low pressure.

In the present embodiment, an interior blower 19 discharges the air to flow into the passenger cabin via the cooling evaporator 18. The interior blower 19 is an electric blower of which rotational speed (i.e., a volume of air discharged from the electric blower) is controlled based on a control voltage output from the controller. The cooling evaporator 18 is disposed in a housing of an interior air-conditioning unit (not shown). The expansion valve 17 and the interior air-conditioning unit are disposed on an inner side of an instrument panel (not shown) positioned front-most in the passenger cabin.

A refrigerant outlet of the cooling evaporator 18 is connected to an inlet of the thermosensitive path 17b of the expansion valve 17. As such, refrigerant flowing out of the cooling evaporator 18 flows into the thermosensitive path 17b.

The expansion valve 17 includes a displaceable member (i.e., a diaphragm) and a valve body. The displaceable member moves in response to a change in a temperature and a pressure of the refrigerant flowing through the thermosensitive path 17b. The valve body adjusts an opening degree of the decompression path 17a in response to the displacement of the displaceable member.

An outlet of the thermosensitive path 17b is connected to a merging part 20. As such, the refrigerant flowing out of the cooling evaporator 18 flows into the merging part 20 via the thermosensitive path 17b.

The merging part 20 is configured by a three-way joint including three ports, similar to the first branch portion 12. The three ports include two refrigerant inlet ports and one refrigerant outlet port. One of the two refrigerant inlet ports of the merging part 20 is a first refrigerant inlet port connected to the outlet of the thermosensitive path 17b. The other one of the refrigerant inlet ports of the merging part 20 is a second refrigerant inlet port connected to the ejector 22 and takes in refrigerant flowing out of the ejector 22 as described hereafter. The refrigerant outlet port of the merging part 20 is connected to the suction port of the compressor 11.

The ejector 22 includes a nozzle 221 and draws refrigerant of the other flow divided in the first branch portion 12 from a nozzle inlet 22a (or a refrigerant inlet). A first switching valve 21 serving as a first passage switch is disposed between the first branch portion 12 and the nozzle inlet 22a to open and close a refrigerant passage extending between the second refrigerant outlet port of the first branch portion 12 and the nozzle inlet 22a of the ejector 22. An operation of the first switching valve 21 is controlled by a control signal output from the controller.

The ejector 22 further includes a refrigerant suction port 22b that draws refrigerant flowing out of the refrigerator evaporator 25. A refrigerant inlet of the refrigerator evaporator 25 is connected to the second refrigerant outlet port of the second branch portion 16 via a second switching valve 23 serving as a second passage switch and the fixed throttle 24.

The second switching valve 23 opens and closes a refrigerant path extending between the second refrigerant outlet port of the second branch portion 16 and the fixed throttle 24. An operation of the second switching valve 23 is controlled by a control signal output from the controller.

The fixed throttle 24 decompresses the liquid refrigerant flowing from the reservoir 15 to be the refrigerant at a low pressure. The fixed throttle 24 may be an orifice, a capillary tube, a nozzle or the like.

The refrigerator evaporator 25 is a heat-absorbing heat exchanger and evaporates the refrigerant at the low pressure flowing from the fixed throttle 24. Specifically, the refrigerator evaporator 25 performs a heat exchange between the refrigerant at the low pressure from the fixed throttle 24 and air in a refrigerator (not shown). The low-refrigerant from the fixed throttle 24 absorbs heat from the air in the heat exchange and is evaporated. As a result, the refrigerator evaporator 25 cools the air in the refrigerator by absorbing heat from the air using the refrigerant at the low pressure.

In the present embodiment, a refrigerator blower 26 discharges the air toward the refrigerator evaporator 25. The refrigerator blower 26 is an electric blower of which rotational speed (i.e., a volume of air discharged from the electric blower) is controlled based on a control voltage output from the controller (not shown).

The refrigerator evaporator 25 has a refrigerant outlet connected to the refrigerant suction port 22b of the ejector 22. The refrigerant flowing out of the refrigerator evaporator 25 after absorbing heat to the air flows into the ejector 22 from the refrigerant suction port 22b.

Thus, the ejector 22 takes in the refrigerant of the other flow divided in the first branch portion 12 and the refrigerant of the other flow divided in the second branch portion 16 and discharges the refrigerants to the merging port 20. As such, the ejector 22 serves as a refrigerant circulator (or a refrigerant transporter). Specifically, the ejector 22 draws and transports refrigerant using suction force of injection refrigerant, which is injected from the nozzle 221 at a high speed, so that the refrigerant circulates in the refrigeration circuit.

Figure 2:
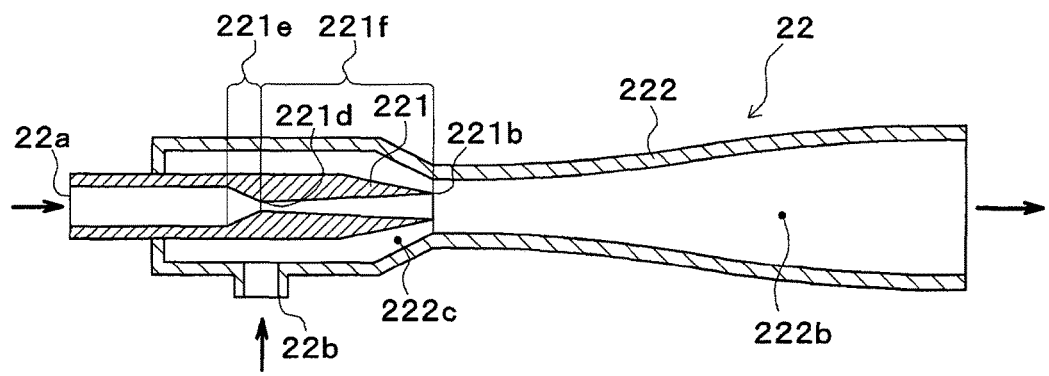
FIG. 2 is a cross-sectional view of an ejector in the first embodiment.

A configuration of the ejector 22 will be described in more detail with reference to FIG. 2. As shown in FIG. 2, the ejector 22 includes the nozzle 221 and a body 222. The nozzle 221 is made of metal (e.g., a stainless alloy) and has a tubular form tapered toward a downstream side along a flow direction of the refrigerant. The nozzle 221 takes in the refrigerant from the nozzle inlet 22a, decompresses the refrigerant isentropically, and injects the refrigerant, as an injection refrigerant (or a first injection refrigerant), from a refrigerant injection port 221b. The refrigerant injection port 221b is defined at most downstream in the nozzle 221 along the flow direction of the refrigerant.

The nozzle 221 defines a refrigerant path therein that decompresses the refrigerant flowing into the nozzle 221 from the nozzle inlet 22a.

The refrigerant path defined in the nozzle 221 includes a narrowest portion 221d, a tapered portion 221e, and a diffuser portion 221f. The narrowest portion 221d has a passage cross-sectional area that is the smallest in the refrigerant path defined in the nozzle 221. The tapered portion 221e decreases a passage cross-sectional area thereof toward the narrowest portion 221d. The diffuser portion 221f increases a passage cross-sectional area thereof from the narrowest portion 221d to the refrigerant injection port 221b.

More specifically, the tapered portion 221e has a truncated cone shape that decreases the passage cross-sectional area thereof toward the narrowest portion 221d. The diffuser portion 221f has a truncated cone shape that increases the passage cross-sectional area thereof from the narrowest portion 221d to the refrigerant injection port 221b. The tapered portion 221e and the diffuser portion 221f are arranged coaxially. That is, the nozzle 221 is configured as a Laval nozzle.

The body 222 is made of metal (e.g., aluminum) and has substantially a tubular shape. The body 222 defines an outer shell of the ejector 22 and serves as a retaining member that supports and fixes the nozzle 221 therein. More specifically, the nozzle 221 is inserted into the body 222 from one side of the body 222 along a longitudinal direction of the body 222 and fixed in the body 222 by a method such as press-fitting.

The body 222 includes an outer surface that faces an outer surface of the nozzle 221 and defines the refrigerant suction port 22b. The refrigerant suction port 22b passes through the body 222 in a thickness direction and is in fluid communication with the refrigerant injection port 221b of the nozzle 221. In other words, the refrigerant suction port 22b is a through-hole that draws refrigerant, which flows from a refrigerator evaporator 25, into the ejector 22 by suction force of the injection refrigerant injected from the refrigerant injection port 221b of the nozzle 221. The refrigerant suction port 22b draws the refrigerant as a suction refrigerant (or a first suction refrigerant).

The body 222 defines an inlet space therein that takes in the refrigerant. The inlet space is defined around the refrigerant suction port 22b. The nozzle 221 includes a tapered portion that is tapered toward a downstream end of the nozzle 221. An outer surface of the tapered portion of the nozzle 221 together with an inner surface of the body 222 defines a suction path 222c that guides the suction refrigerant flowing into the body 222 to flow to a diffuser portion 222b (i.e., a pressure increasing portion).

The suction path 222c decreases a passage cross-sectional area thereof toward the downstream side along the flow direction of the refrigerant. As such, the ejector 22 can increase a flow speed of the suction refrigerant passing through the suction path 222c. As a result, an energy loss (i.e., a mixing loss) caused when the suction refrigerant and the injection refrigerant are mixed in the diffuser portion 222b can be reduced.

The diffuser portion 222b is defined to extend from an outlet of the suction path 222c. The diffuser portion 222b increases a passage cross-sectional area thereof toward the downstream side gradually. As such, the diffuser portion 222b converts kinetic energy of the mixed refrigerant of the injection refrigerant and the suction refrigerant into pressure energy. That is, the diffuser portion 222b serves as the pressure increasing portion that increases a pressure of the mixed refrigerant by reducing a flow speed of the mixed refrigerant.

More specifically, the inner surface of the body 222 defining the diffuser portion 222b has a shape defined by a plurality of curved lines. The passage cross-sectional area of the diffuser portion 222b increases with a broadening degree of the diffuser portion 222b increased once and decreased subsequently toward the downstream side along the flow direction of the refrigerant. As a result, the diffuser portion 222b can decompress the refrigerant isentropically.

In the present embodiment, the first branch portion 12, the first switching valve 21, the ejector 22, and the merging part 20 are disposed in the engine room.

The controller (not shown) includes a known microcomputer provided with a CPU, a ROM, a RAM, and the like, and a peripheral circuit of the microcomputer. The controller performs various calculations and processes based on control programs stored in the ROM, and controls actuations of the various devices connected to the output side.

A sensor group of various sensors for air-conditioning control including an inside-air temperature sensor, an outside-air temperature sensor, an insolation sensor, a cooling-evaporator temperature sensor, a refrigerator-evaporator temperature sensor, an outlet temperature sensor, and an outlet pressure sensor is connected to the input side of the controller for air conditioning. Detection signals output from the sensor group are input to the controller.

The inside-air temperature sensor detects a temperature in the passenger cabin. The outside-air temperature sensor detects a temperature outside the passenger cabin. The insolation sensor detects an amount of solar radiation radiated into the passenger cabin. The cooling-evaporator temperature sensor detects a temperature of air discharged from the cooling evaporator 18, i.e., a temperature of the cooling evaporator 18. The refrigerator-evaporator temperature sensor detects a temperature of air discharged from the refrigerator evaporator 25, i.e., a temperature of the refrigerator evaporator 25. The outlet temperature sensor detects a temperature of the refrigerant at the refrigerant outlet of the radiator 13. The outlet pressure sensor detects a pressure of the refrigerant at the refrigerant outlet of the radiator 13.

An input side of the controller is connected to an operation panel (not shown) that is arranged near the instrument panel positioned at the front most in the passenger cabin. The operation panel includes various operation switches, and operation signals output from the operation switches are input to the controller.

The operation switches of the operation panel include an air-conditioning operation switch, a cabin-temperature setting switch, a refrigerator operation switch, and a refrigerator-temperature setting switch. The air-conditioning operation switch requests to perform an air conditioning (i.e., an air-conditioning operation) for the passenger cabin. The cabin-temperature setting switch sets a target temperature of an inside temperature of the passenger cabin. The refrigerator operation switch requests to perform an air conditioning (i.e., an air-conditioning operation) for the refrigerator. The refrigerator-temperature setting switch sets a target temperature of an inside temperature of the refrigerator.

The controller is configured integrally with control units that are configured to control various object devices connected to the output sides of the control units respectively. Specifically, the controller includes structures (e.g., hardware and software) configured to control the object devices, and the structures configure the control units for the object devices respectively. As an example, a structure included in the controller and configured to control an operation of the compressor 11 configures a discharge capacity control unit.

Next, the operation with the above-described configurations in the present embodiment will be described. The controller performs an air-conditioning and refrigerating operation when both of the air-conditioning operation switch and the refrigerator operation switch of the operation panel are turned on. The controller performs an air-conditioning operation when the air-conditioning operation switch of the operation panel is turned on and the refrigerator operation switch of the operation panel is not turned on.

In the air-conditioning and refrigerating operation, the controller operates the compressor 11, the exterior blower 14, the interior blower 19 and the refrigerator blower 26 and opens the first switching valve 21 and the second switching valve 23.

Figure 3:
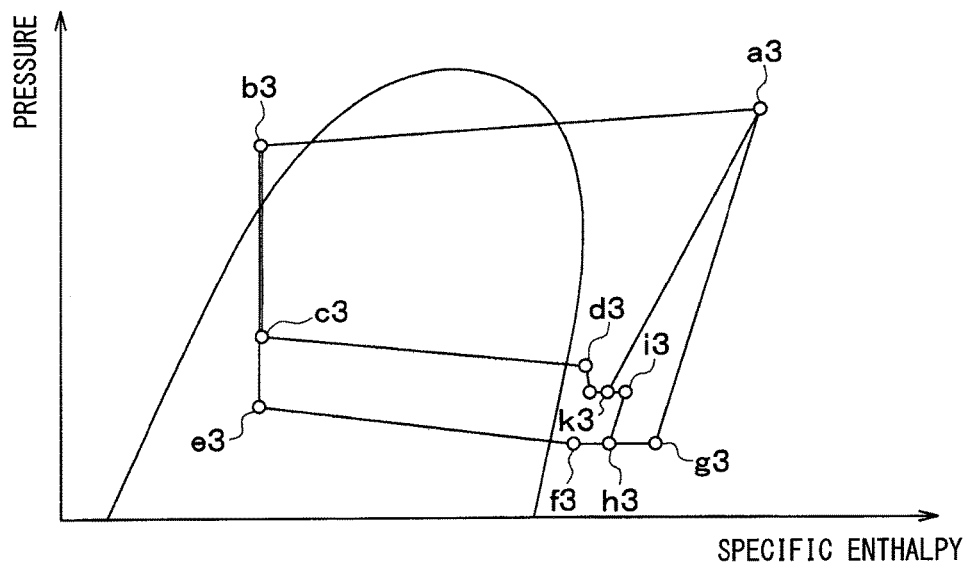
FIG. 3 is a Mollier diagram showing states of the refrigerant circulating in the refrigeration cycle device during the air-conditioning and refrigerating operation in the first embodiment.

As such, in the air-conditioning and refrigerating operation, as shown in FIG. 1 and FIG. 3, the compressor 11 discharges the refrigerant at a high temperature and a high pressure (at point a3 in FIG. 3), and the first branch portion 12 divides a flow of the refrigerant at high temperature and high pressure into the one flow flowing toward the radiator 13 and the other flow flowing toward the nozzle inlet 22a of the ejector 22.

The refrigerant of the one flow divided in the first branch portion 12 flows into the radiator 13 and radiates heat in the radiator 13 by exchanging heat with the outside air discharged from the exterior blower 14. As a result, the refrigerant of the one flow divided in the first branch portion 12 is condensed in the radiator 13 (from point a3 to point b3 in FIG. 3).

The refrigerant after radiating heat in the radiator 13 flows into the second branch portion 16. The second branch portion 16 divides the flow of the refrigerant into the one flow flowing toward the expansion valve 17 and the other flow flowing toward the fixed throttle 24. The refrigerant of the one flow divided in the second branch portion 16 flows into a decompression path 17a of the expansion valve 17 and is decompressed isenthalpically in the expansion valve 17 (from point b3 to point c3 in FIG. 3).

The refrigerant, after decompressed in the decompression path 17a of the expansion valve 17, flows into the cooling evaporator 18 and is evaporated in the cooling evaporator 18 by absorbing heat from air discharged from the interior blower 19 (from point c3 to point d3 in FIG. 3).

The refrigerant of the other flow divided in the second branch portion 16 flows into the fixed throttle 24 and is decompressed isenthalpically in the fixed throttle 24 (from point b3 to point e3 in FIG. 3).

The refrigerant decompressed in the fixed throttle 24 flows into the refrigerator evaporator 25 and is evaporated in the refrigerator evaporator 25 by absorbing heat from air discharged from the refrigerator blower 26 (from point e3 to point f3 in FIG. 3).

The refrigerant of the other flow divided in the first branch portion 12 flows into the nozzle 221 of the ejector 22 from the nozzle inlet 22a, is decompressed in the nozzle 221 isentropically, and then is injected from the refrigerant injection port 221b as an injection refrigerant (from point a3 to point g3 in FIG. 3).

The refrigerant flowing out of the refrigerator evaporator 25 is drawn into the ejector 22 from the refrigerant suction port 22b as a suction refrigerant by suction force of the injection refrigerant injected from the refrigerant injection port 221b. The injection refrigerant and the suction refrigerant flow into the diffuser portion 222b (from point f3 to point h3 and from point g3 to point h3 in FIG. 3).

Since the diffuser portion 222b increases a passage cross-sectional area thereof, the diffuser portion 222b converts kinetic energy of the refrigerant into pressure energy. As such, the diffuser portion 222b mixes the injection refrigerant from the refrigerant injection port 221b and the suction refrigerant from the refrigerant suction port 22b to be a mixed refrigerant and increases a pressure of the mixed refrigerant (from point h3 to point i3 in FIG. 3).

The mixed refrigerant flowing out of the diffuser portion 222b and the refrigerant flowing out of the cooling evaporator 18 are collected in the merging part 20. Subsequently, the collected refrigerant flows into the compressor 11 from the suction port and is compressed again (from point i3 to point k3 and from point d3 to point k3 in FIG. 3).

The refrigeration cycle device 10 in the present embodiment is operated as described above in the air-conditioning and refrigerating operation. As a result, the refrigeration cycle device 10 can cool air flowing toward the passenger cabin while cooling air in the refrigerator. Moreover, the refrigeration cycle device 10 can decrease a pressure of the refrigerant in the refrigerator evaporator 25 to be lower than a pressure of the refrigerant in the cooling evaporator 18 for an increase in a pressure of the refrigerant in the ejector 22. As such, an evaporation temperature at which the refrigerant is evaporated in the refrigerator evaporator 25 can be lower than an evaporation temperature at which the refrigerant is evaporated in the cooling evaporator 18.

Here, when the liquid refrigerant flows into the nozzle 221, the liquid refrigerant flows through the nozzle 221 with large inertia. As a result, a flow speed of the liquid refrigerant flowing through the nozzle 221 would be increased and decreased hardly. However, in the present embodiment, the gas refrigerant flows into the nozzle 221. The gas refrigerant flows through the nozzle 221 with small inertia. Therefore, a flow speed of the gas refrigerant flowing through the nozzle 221 can be adjusted easily to be a required speed. As such, the ejector 22 can be operated with high efficiency.

In the air-conditioning operation, the controller operates the compressor 11, the exterior blower 14 and the interior blower 19 and closes the first switching valve 21 and the second switching valve 23.

Figure 4:
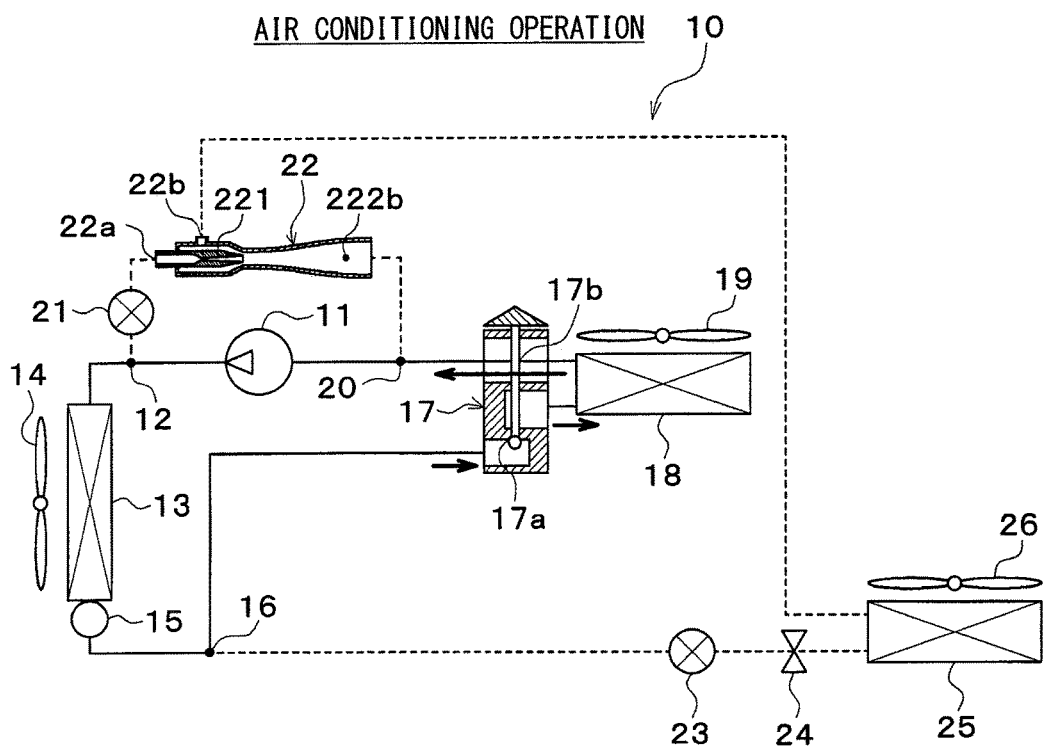
FIG. 4 is a diagram schematically illustrating an overall configuration of a refrigeration cycle device and showing flows of refrigerant in an air-conditioning operation in the first embodiment.

As such, in the air-conditioning operation, as shown in FIG. 4, the compressor 11 discharges the refrigerant at high temperature and high pressure. The refrigerant at high temperature and high pressure flows into the radiator 13 and radiates heat in the radiator 13 by exchanging heat with the outside air discharged from the exterior blower 14. As such, the refrigerant at high temperature and high pressure is condensed in the radiator 13.

The refrigerant flowing out of the radiator 13 flows into the decompression path 17a of the expansion valve 17 and is decompressed isenthalpically in the decompression path 17a.

The refrigerant, after decompressed in the decompression path 17a of the expansion valve 17, flows into the cooling evaporator 18 and is evaporated in the cooling evaporator 18 by absorbing heat from air discharged from the interior blower 19.

The refrigerant flowing out of the cooling evaporator 18 is drawn into the compressor 11 from the suction port and is compressed again.

The refrigeration cycle device 10 in the present embodiment is operated as described above in the air-conditioning operation to cool air flowing toward the passenger cabin.

In the air-conditioning and refrigerating operation in the present embodiment, the first branch portion 12 divides the flow of the refrigerant discharged from the compressor 11 into the one flow and the other flow. The refrigerant of the one flow divided in the first branch portion 12 flows into the radiator 13, and the radiator 13 radiates heat of the refrigerant. The second branch portion 16 divides the flow of the refrigerant, which flows from the radiator 13 after radiating heat, into the one flow and the other flow.

The refrigerant of the one flow divided in the second branch portion 16 flows into the expansion valve 17, and the expansion valve 17 decompresses the refrigerant to be the refrigerant at a low pressure. The refrigerant at the low pressure decompressed in the expansion valve 17 flows into the cooling evaporator 18. The cooling evaporator 18 evaporates the refrigerant at the low pressure and cools air flowing toward the passenger cabin. The refrigerant of the other flow divided in the second branch portion 16 flows into the fixed throttle 24, and the fixed throttle 24 decompresses the refrigerant to be the refrigerant at the low pressure. The refrigerant at the low pressure decompressed in the fixed throttle 24 flows into the refrigerator evaporator 25. The refrigerator evaporator 25 evaporates the refrigerant at the low pressure and cools air in the refrigerator.

The nozzle 221 decompresses and injects the refrigerant of the other flow divided in the first branch portion 12. The nozzle 221 injects the refrigerant as the injection refrigerant. The refrigerant suction port 22b draws, as the suction refrigerant, the refrigerant evaporated in the refrigerator evaporator 25. The diffuser portion 222b mixes the injection refrigerant from the nozzle 221 and the suction refrigerant form the refrigerant suction port 22b to be the mixed refrigerant and increases a pressure of the mixed refrigerant. The refrigerant flowing out of the cooling evaporator 18 and the mixed refrigerant after a pressure of which is increased in the diffuser portion 222b are collected in the merging part 20.

According to the above-described configuration, a pressure of the refrigerant in the refrigerator evaporator 25 can be lower than a pressure of the refrigerant in the cooling evaporator 18 for an increase in a pressure of the refrigerant in the ejector 22. As such, the evaporation temperature at which the refrigerant is evaporated in the refrigerator evaporator 25 can be lower than the evaporation temperature at which the refrigerant is evaporated in the cooling evaporator 18.

Therefore, each of the cooling evaporator 18 and the refrigerator evaporator 25 can evaporate the refrigerant separately from each other while allowing the refrigerant to flow through both of the cooling evaporator 18 and the refrigerator evaporator 25 continuously. As such, the cooling evaporator 18 and the refrigerator evaporator 25 can evaporate refrigerant separately from each other without changing a pressure of the refrigerant drastically. That is, the passenger cabin and the refrigerator can be cooled separately from each other without changing a pressure of the refrigerant drastically.

Furthermore, since the gas refrigerant flows into the nozzle 221 of the ejector 22, the ejector 22 can be operated with high efficiency.

In the present embodiment, the first switching valve 21 opens and closes the refrigerant path extending between the first branch portion 12 and the nozzle 221 of the ejector 22, and the second switching valve 23 opens and closes the refrigerant path extending between the second branch portion 16 and the fixed throttle 24. As such, the air-conditioning and refrigerating operation and the air-conditioning operation can be switched.

Second Embodiment

Figure 5:
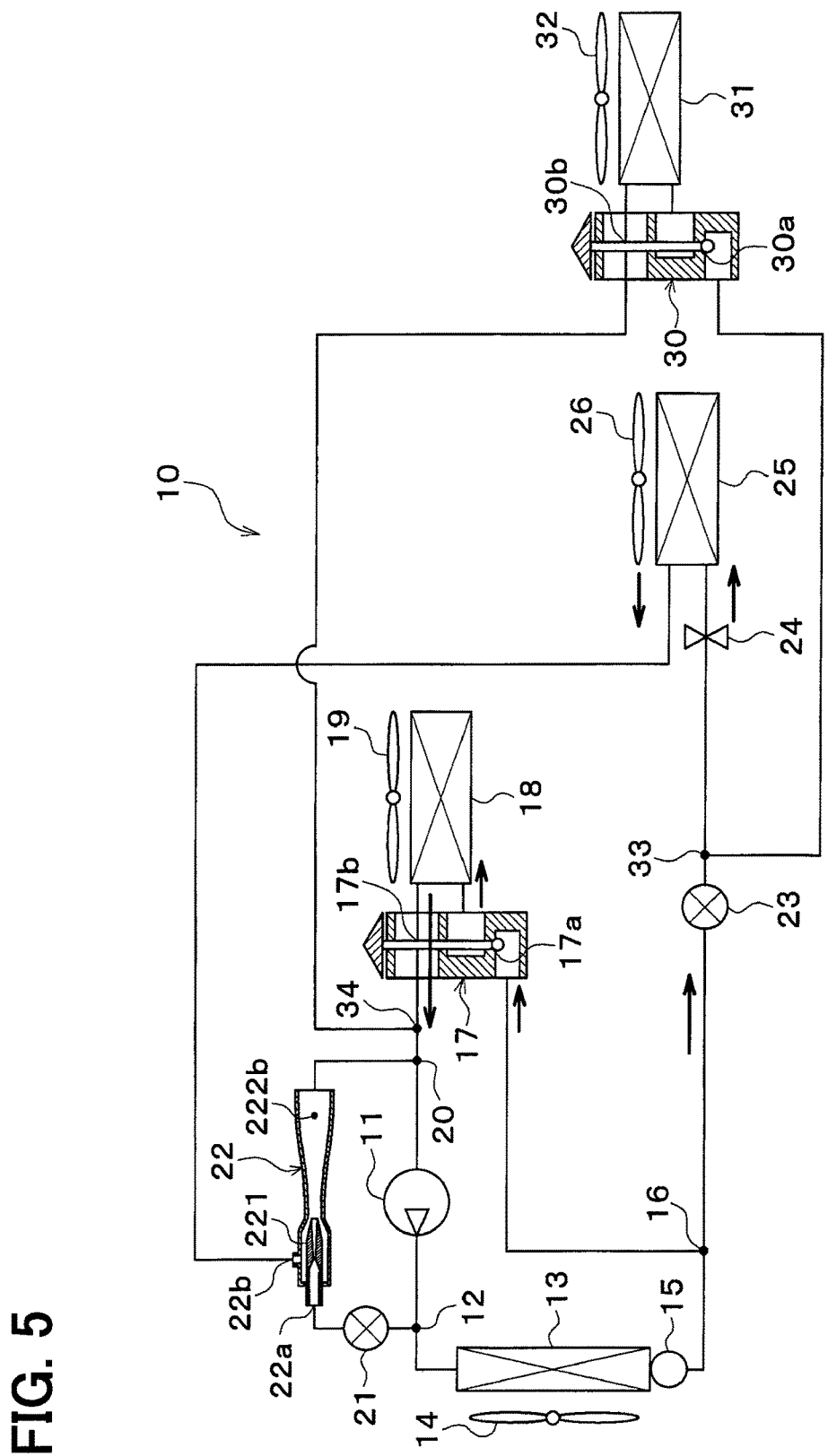
FIG. 5 is a diagram schematically illustrating an overall configuration of a refrigeration cycle device in a second embodiment.

As shown in FIG. 5, the refrigeration cycle device 10 in the present embodiment further includes a second expansion valve 30 serving as a third decompressor, a rear-seat cooling evaporator 31 serving as a third evaporator, a rear-seat cooling branch portion 33, and a second merging part 34 as compared to the refrigeration cycle device 10 in the first embodiment.

The rear-seat cooling branch portion 33 is located between the second switching valve 23 and the fixed throttle 24. The rear-seat cooling branch portion 33 divides a flow of the refrigerant flowing out of the second switching valve 23 into one flow flowing to the refrigerator evaporator 25 and an other flow flowing toward the rear-seat cooling evaporator 31.

The rear-seat cooling branch portion 33 is configured by a three-way joint including three ports. The three ports include one refrigerant inlet port and two refrigerant outlet ports. As an example, the three-way joint may be formed by assembling pipes having different diameters respectively by a method such as welding. Alternatively, the three-way joint may be formed by a metal block or a resin block defining refrigerant passages therein.

The refrigerant inlet port of the rear-seat cooling branch portion 33 is connected to an outlet of the second switching valve 23. As such, the refrigerant of the other flow divided in the second branch portion 16 flows to the rear-seat cooling branch portion 33 via the second switching valve 23.

One of the two refrigerant outlet ports of the rear-seat cooling branch portion 33 is a first refrigerant outlet port connected to the refrigerant evaporator 25 via the fixed throttle 24. The refrigerant of the one flow divided in the rear-seat cooling branch portion 33 flows into the refrigerator evaporator 25 via the fixed throttle 24.

The other one of the two refrigerant outlet ports of the rear-seat cooling branch portion 33 is a second refrigerant outlet port connected to the rear-seat cooling evaporator 31 via the second expansion valve 30.

The second expansion valve 30 reduces a pressure of refrigerant and expands the refrigerant. The second expansion valve 30 is a thermosensitive expansion valve and defines a fluid passage therein that allows a fluid to flow therethrough. The second expansion valve 30 includes a mechanical mechanism that adjusts a passage cross-sectional area (i.e., a throttle degree) of the fluid passage. Specifically, in the present embodiment, the mechanical mechanism adjusts a degree of superheat of the refrigerant in the refrigerant outlet of the second expansion valve 30 to be maintained within a specified range.

More specifically, the second expansion valve 30 defines a decompression path 30a and a thermosensitive path 30b therein.

The second expansion valve 30 includes a displaceable member (i.e., a diaphragm) and a valve body. The displaceable member moves in response to changes in a temperature and a pressure of the refrigerant flowing through the thermosensitive path 30b. The valve body adjusts an opening degree of the decompression path 30a in response to the displacement of the displaceable member.

An inlet of the decompression path 30a is connected to the second refrigerant outlet port of the rear-seat cooling branch portion 33. As such, the refrigerant of the other flow divided in the rear-seat cooling branch portion 33 flows into the decompression path 30a. The decompression path 30a allows the refrigerant of the other flow divided in the rear-seat cooling branch portion 33 to flow therethrough and decompresses the refrigerant to be the refrigerant at the low pressure. An outlet of the decompression path 30a is connected to a refrigerant inlet of the rear-seat cooling evaporator 31. As such, the refrigerant at the low pressure decompressed in the decompression path 30a flows into the rear-seat cooling evaporator 31.

A refrigerant outlet of the rear-seat cooling evaporator 31 is connected to the second merging part 34 via the thermosensitive path 30b of the second expansion valve 30. The thermosensitive path 30b allows refrigerant flowing out of the rear-seat cooling evaporator 31 to flow therethrough. As such, the refrigerant of the other flow divided in the rear-seat cooling branch portion 33 flows through the decompression path 30a, the rear-seat cooling evaporator 31, and the thermosensitive path 30b in this order and then flows into the second merging part 34.

The second merging part 34 is configured by a three-way joint including three ports, similar to the rear-seat cooling branch portion 33. The three ports include two refrigerant inlet ports and one refrigerant outlet port.

One of the two refrigerant inlet ports of the second merging part 34 is a first refrigerant inlet port connected to an outlet of the thermosensitive path 30b. The other one of the two refrigerant inlet ports of the second merging part 34 is a second refrigerant inlet port connected to the outlet of the thermosensitive path 17b of the expansion valve 17. The refrigerant outlet port of the second merging part 34 is connected to the first refrigerant inlet port of the merging part 20.

Thus, the second merging part 34 collects refrigerant after flowing through the first expansion valve 17 and the cooling evaporator 18 and refrigerant after flowing through the second expansion valve 30 and the rear-seat cooling evaporator 31.

The rear-seat cooling evaporator 31 is a heat-absorbing heat exchanger and evaporates the refrigerant at a low pressure flowing from the second expansion valve 30. Specifically, the rear-seat cooling evaporator 31 performs a heat exchange between the refrigerant at the low pressure from the second expansion valve 30 and air flowing toward the passenger cabin. The low-refrigerant from the second expansion valve 30 absorbs heat from the air in the heat exchange and is evaporated. As a result, the rear-seat cooling evaporator 31 cools the air flowing toward the passenger cabin by absorbing heat from the air using the refrigerant at the low pressure. As an example, the air cooled in the rear-seat cooling evaporator 31 flows toward a rear-seat in the passenger cabin.

A rear-seat interior blower 32 supplies the air to the rear-seat cooling evaporator 31. The rear-seat interior blower 32 is an electric blower of which rotational speed (i.e., a volume of air discharged from the electric blower) is controlled based on a control voltage output from the controller.

Similar to the above-described first embodiment, the controller opens the first switching valve 21 and the second switching valve 23 in the air-conditioning and refrigerating operation.

In the present embodiment, the refrigerant after radiating heat in the radiator 13 is decompressed in the second expansion valve 30, and the refrigerant decompressed in the second expansion valve 30 is evaporated in the rear-seat cooling evaporator 31. Therefore, the cooling evaporator 18 can cool air flowing toward a front seat in the passenger cabin, the rear-seat cooling evaporator 31 can cool air flowing toward the rear seat in the passenger cabin, and the refrigerator evaporator 25 can cool air in the refrigerator.

Third Embodiment

Figure 6:
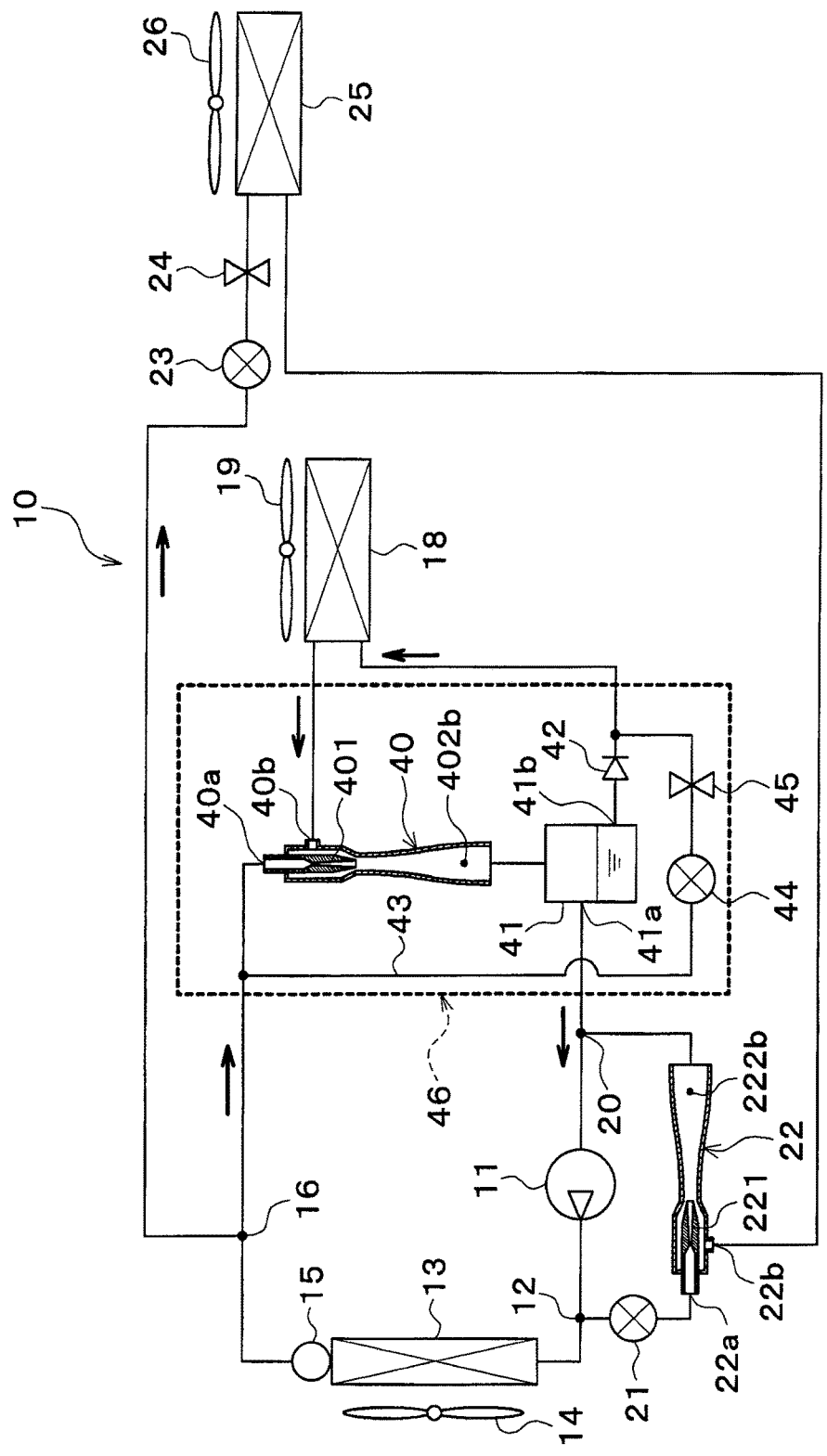
FIG. 6 is a diagram schematically illustrating an overall configuration of a refrigeration cycle device in a third embodiment.

As shown in FIG. 6, in the present embodiment, a second ejector 40 replaces the expansion valve 17 of the above-described first embodiment. That is, the refrigeration cycle device 10 has two ejectors. The refrigeration cycle device 10 in the present embodiment further has a gas-liquid separator 41, a check valve 42, a bypass passage 43 with a bypass switching valve and a bypass fixed throttle 45.

Hereinafter, the ejector 22 described above will be referred to as a first ejector. The nozzle 221, the nozzle inlet 22a, the refrigerant suction port 22b, and the diffuser portion 22b of the first ejector 22 will be referred to as a first nozzle, a first nozzle inlet, a first refrigerant suction port, and a first diffuser portion respectively. The first diffuser portion 222b serves as a first pressure increasing portion of the present disclosure.

The basic configuration of the second ejector 40 is the same as the basic configuration of the first ejector 22 and includes a second nozzle 401 (or a second refrigerant inlet) with a second nozzle inlet 40a, a second refrigerant suction port 40b, and a second diffuser portion 402b. The second diffuser portion 402b serves as a second pressure increasing portion of the present disclosure.

The refrigerant outlet of the reservoir 15 is connected to the second nozzle inlet 40a of the second ejector 40. The second ejector 40 serves as a refrigerant pressure reducing device that reduces a pressure of a high-pressure liquid refrigerant flowing from the reservoir 15 and discharges the refrigerant to a downstream side. The second ejector 40 serves as a refrigerant circulator (or a refrigerant transporter). Specifically, the second ejector 40 draws and transports refrigerant, which flows from the cooling evaporator 18, by suction force of injection refrigerant, which is injected from a nozzle at a high speed, so that the refrigerant circulates in the refrigeration circuit.

The second diffuser portion 402b includes a refrigerant outlet that is connected to a refrigerant inlet of the gas-liquid separator 41. The gas-liquid separator 41 is a gas-liquid separating device that divides the refrigerant flowing out of the second diffuser portion 402b into gas refrigerant and liquid refrigerant. In the present embodiment, the gas-liquid separator 41 has a relatively small capacity and discharges the liquid refrigerant almost without storing the liquid refrigerant. However, the gas-liquid separator 41 may be configured to serve as a liquid reservoir that stores an excess volume of the liquid refrigerant in the refrigeration circuit.

Specifically, the gas-liquid separator 41 includes a gas-refrigerant outlet 41a discharging the gas refrigerant and a liquid-refrigerant outlet 41b discharging the liquid refrigerant.

The gas-refrigerant outlet 41a is connected to the suction port of the compressor 11. The liquid-refrigerant outlet 41b is connected to the refrigerant inlet of the cooling evaporator 18 via the check valve 42. The check valve 42 allows the liquid refrigerant to flow from the liquid-refrigerant outlet 41b toward the cooling evaporator 18 and prevents refrigerant from flowing from the cooling evaporator 18 into the gas-refrigerant outlet 41a.

The refrigerant outlet of the cooling evaporator 18 is connected to the second refrigerant suction port 40b of the second ejector 40.

The bypass passage 43 is disposed so that one end of the bypass passage 43 is connected to a refrigerant path extending between the second branch portion 16 and the second nozzle inlet 40a of the second ejector 40. The other end of the bypass passage 43 is connected to a refrigerant path extending between the check valve 42 and the cooling evaporator 18.

The bypass passage 43 is a refrigerant passage through which the liquid refrigerant flowing out of the reservoir 15 flows while bypassing the second ejector 40, the gas-liquid separator 41 and the check valve 42. A bypass switching valve 44 and the bypass fixed throttle 45 are disposed in the bypass passage 43.

The bypass switching valve 44 is a switching device and opens and closes the bypass passage 43. An operation of the bypass switching valve 44 is controlled by a control signal output from the controller. The controller opens the bypass switching valve 44 when a load is low and closes the bypass switching valve 44 when the load is not low.

The bypass fixed throttle 45 serves as a decompressor that decompresses the liquid refrigerant flowing from the reservoir 15. Specifically, the bypass fixed throttle 45 may be an orifice, a capillary tube, a nozzle or the like.

The second ejector 40, the gas-liquid separator 41, the check valve 42, the bypass passage 43, the bypass switching valve 44 and the bypass fixed throttle 45 are assembled integrally to form an ejector module 46.

In the present embodiment, the second ejector 40 includes the second nozzle 401, the second refrigerant suction port 40b, and the second diffuser portion 402b. The second nozzle 401 decompresses and injects the refrigerant, which flows from the radiator 13 after radiating heat in the radiator 13. The second nozzle 401 injects the refrigerant as an injection refrigerant (i.e., a second injection refrigerant). The second refrigerant suction port 40b draws, as a suction refrigerant (i.e., a second suction refrigerant), the refrigerant evaporated in the cooling evaporator 18. The second diffuser portion 402b mixes the second injection refrigerant from the second nozzle 401 and the second suction refrigerant form the second refrigerant suction port 40b to be a second mixed refrigerant and increases a pressure of the second mixed refrigerant.

The gas-liquid separator 41 divides the second mixed refrigerant, which flows from the second diffuser portion 402b after a pressure of which is increased in the second diffuser portion 402b, into gas refrigerant and liquid refrigerant. The gas-liquid separator 41 discharges the gas refrigerant toward the compressor 11 and discharges the liquid refrigerant toward the cooling evaporator 18.

As such, the refrigerant after the pressure of which is increased in the second ejector 40 is drawn into the compressor 11. As a result, power consumed by the compressor 11 can be reduced, and coefficient of performance (COP) of the refrigeration circuit can be improved.

Fourth Embodiment

Figure 7:
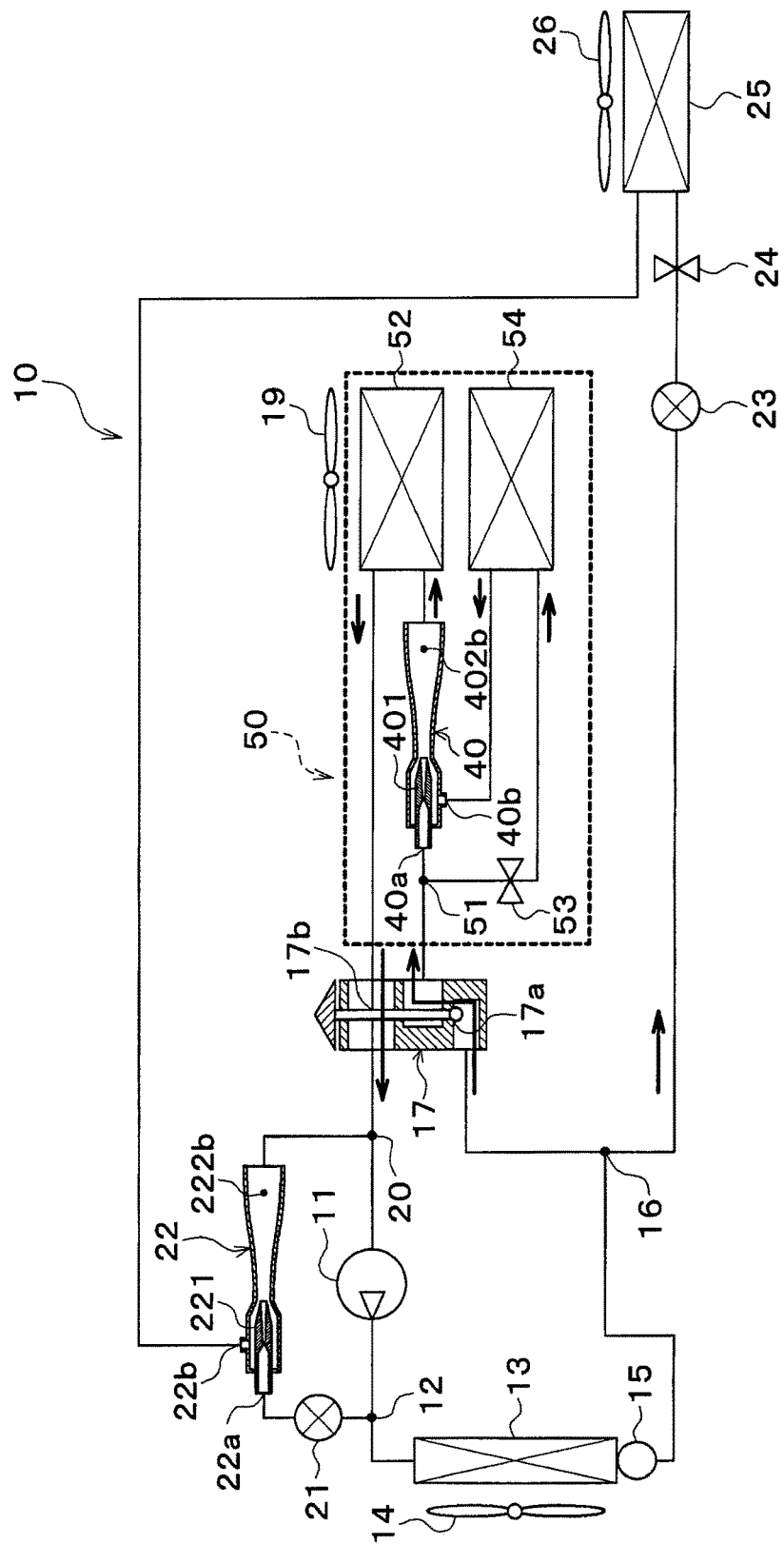
FIG. 7 is a diagram schematically illustrating an overall configuration of a refrigeration cycle device in a fourth embodiment.

As shown in FIG. 7, in the present embodiment, an evaporator unit 50 replaces the cooling evaporator 18 of the above-described first embodiment.

The evaporator unit 50 evaporates the refrigerant at the low pressure decompressed in the decompression path 17a of the expansion valve 17. Specifically, the evaporator unit 50 performs a heat exchange between the refrigerant at the low pressure from the expansion valve 17 and air flowing toward the passenger cabin. The refrigerant at the low pressure from the expansion valve 17 absorbs heat from the air during the heat exchange and is evaporated. As a result, the evaporator unit 50 cools the air flowing toward the passenger cabin by absorbing heat from the air using the refrigerant at the low pressure flowing form the expansion valve 17.

A configuration of the evaporator unit 50 will be described in greater detail hereafter.

The evaporator unit 50 includes the second ejector 40, a third branch portion 51, a first cooling evaporator 52 serving as the first evaporator, a second fixed throttle 53 serving as a third decompressor, and a second cooling evaporator 54 serving as a third evaporator. The second ejector 40, the third branch portion 51, the first cooling evaporator 52, the second fixed throttle 53, and the second cooling evaporator 54 are integrally assembled to be one unit.

The refrigerant outlet of the decompression path 17a of the expansion valve 17 is connected to a refrigerant inlet of the third branch portion 51. The third branch portion 51 is configured to divide a flow of refrigerant flowing out of the expansion valve 17 into one flow flowing toward the second ejector 40 and an other flow flowing toward the second cooling evaporator 54.

The third branch portion 51 is configured by a three-way joint including three ports. The three ports include one refrigerant inlet port and two refrigerant outlet ports. As an example, the three-way joint may be formed by assembling pipes having different diameters respectively by a method such as welding. Alternatively, the three-way joint may be formed by a metal block or a resin block defining refrigerant passages therein.

The refrigerant inlet port of the third branch portion 51 is connected to the outlet of the decompression path 17a of the expansion valve 17. As such, the refrigerant at the low pressure decompressed in the decompression path 17a flows into the third branch portion 51.

One of the two refrigerant outlet ports of the third branch portion 51 is a first refrigerant outlet port connected to the second nozzle inlet 40a of the second ejector 40. As such, the refrigerant at the low pressure of the one flow divided in the third branch portion 51 flows into the second nozzle 401 of the second ejector 40.

The other one of the two refrigerant outlet ports of the third branch portion 51 is a second refrigerant outlet port connected to a refrigerant inlet of the second cooling evaporator 54 via the second fixed throttle 53. As such, the refrigerant at the low pressure of the other flow divided in the third branch portion flows into the second fixed throttle 53. The second fixed throttle 53 further decompresses the refrigerant at the low pressure decompressed in the expansion valve 17 to be the refrigerant at a lower pressure. The second fixed throttle 53 may be an orifice, a capillary tube, or the like.

An outlet of the second fixed throttle 53 is connected to a refrigerant inlet of the second cooling evaporator 54. As such, the refrigerant at the lower pressure decompressed in the second fixed throttle 53 flows into the second cooling evaporator 54. The second cooling evaporator 54 evaporates the refrigerant at the lower pressure decompressed in the second fixed throttle 53. A refrigerant outlet of the second cooling evaporator 54 is connected to the second refrigerant suction port 40b of the second ejector 40. As such, the refrigerant evaporated in the second cooling evaporator 54 flows into the second ejector 40 from the second refrigerant suction port 40b Thus, the second ejector 40 collects the refrigerant of the one flow divided in the third branch portion 51 and the refrigerant of the other flow divided in the third branch portion 51 and passing through the second fixed throttle 53 and the second cooling evaporator 54.

In the second ejector 40, the second nozzle 401 decompresses the refrigerant of the one flow divided in the third branch portion 51 and injects the decompressed refrigerant as an injection refrigerant (i.e., a second injection refrigerant). The second refrigerant suction port 40b of the second ejector 40 draws, as a suction refrigerant (i.e., a second suction refrigerant), the refrigerant evaporated in the second cooling evaporator 54. The second diffuser portion 402b of the second ejector 40 mixes the injection refrigerant from the second nozzle 401 and the suction refrigerant form the second refrigerant suction port 40b to be a second mixed refrigerant and increases a pressure of the second mixed refrigerant.

The refrigerant outlet of the second diffuser portion 402b of the second ejector 40 is connected to a refrigerant inlet of the first cooling evaporator 52. As such, the second mixed refrigerant discharged from the second ejector 40 flows into the first cooling evaporator 52. The first cooling evaporator 52 evaporates the second mixed refrigerant discharged from the second ejector 40.

A refrigerant outlet of the first cooling evaporator 52 is connected to the first refrigerant inlet port of the merging part 20 via the thermosensitive path 17b of the expansion valve 17. The outlet of the thermosensitive path 17b is connected to the first refrigerant inlet port of the first merging part 20. As such, the refrigerant evaporated in the first cooling evaporator 52 flows into the first merging part 20 via the thermosensitive path 17b.

An evaporation mechanism of the evaporator unit 50 using the first cooling evaporator 52 and the second cooling evaporator 54 will be described hereafter in greater detail.

The first cooling evaporator 52 and the second cooling evaporator 54 are disposed in the housing of the interior air-conditioning unit (not shown). The interior blower 19 discharges air to flow through the first cooling evaporator 52 and the second cooling evaporator 54. The air after passing through the first cooling evaporator 52 and the second cooling evaporator 54 flows into the passenger cabin. The first cooling evaporator 52 and the second cooling evaporator 54 are arranged in series along the flow direction of the air. Specifically, the second cooling evaporator 54 is located downstream of the first cooling evaporator 52 in a flow direction of the air discharged from the interior blower 19.

The first cooling evaporator 52 evaporates the refrigerant flowing from the second diffuser portion 402b of the second ejector 40. Specifically, the first cooling evaporator 52 performs a heat exchange between the refrigerant at the low pressure decompressed in the expansion valve 17 and the air flowing toward the passenger cabin. The low-refrigerant from the expansion valve 17 absorbs heat from the air and is evaporated during the heat exchange. As a result, the first cooling evaporator 52 cools the air flowing toward the passenger cabin by absorbing heat from the air using the refrigerant at the low pressure.

The second cooling evaporator 54 evaporates the refrigerant at the lower pressure flowing from the second fixed throttle 53. Specifically, the second cooling evaporator 54 performs a heat exchange between the refrigerant at the lower pressure from the second fixed throttle 53 and the air after passing through the first cooling evaporator 52. The low-refrigerant from the second fixed throttle 53 absorbs heat from the air and is evaporated during the heat exchange. As a result, the second cooling evaporator 54 cools the air flowing out of the first cooling evaporator 52 by absorbing heat from the air using the refrigerant at the lower pressure.

According to the above-described configuration, the first cooling evaporator 52 and the second cooling evaporator 54 cool the air flowing toward the passenger cabin.

In addition, the refrigerant after the pressure of which is increased in the second ejector 40 is drawn into the compressor 11. As a result, power consumed by the compressor 11 can be reduced, and coefficient of performance (COP) of the refrigeration circuit can be improved.

Moreover, according to the above-described configuration, the refrigerant is evaporated in the second cooling evaporator 54 at a pressure that is almost the same as a pressure of the refrigerant immediately after being decompressed in the second nozzle 401 of the second ejector 40. The first cooling evaporator 52 and the second cooling evaporator 54 are arranged so that air cooled in the first cooling evaporator 52 flows into the second cooling evaporator 54. As such, a temperature difference between an evaporation temperature, which is a temperature of the refrigerant at which refrigerant is evaporated in the second cooling evaporator 54, and a temperature of the air passing through the second cooling evaporator 54 can be large. Therefore, the air can be cooled with high efficiency.

Fifth Embodiment

Figure 8:
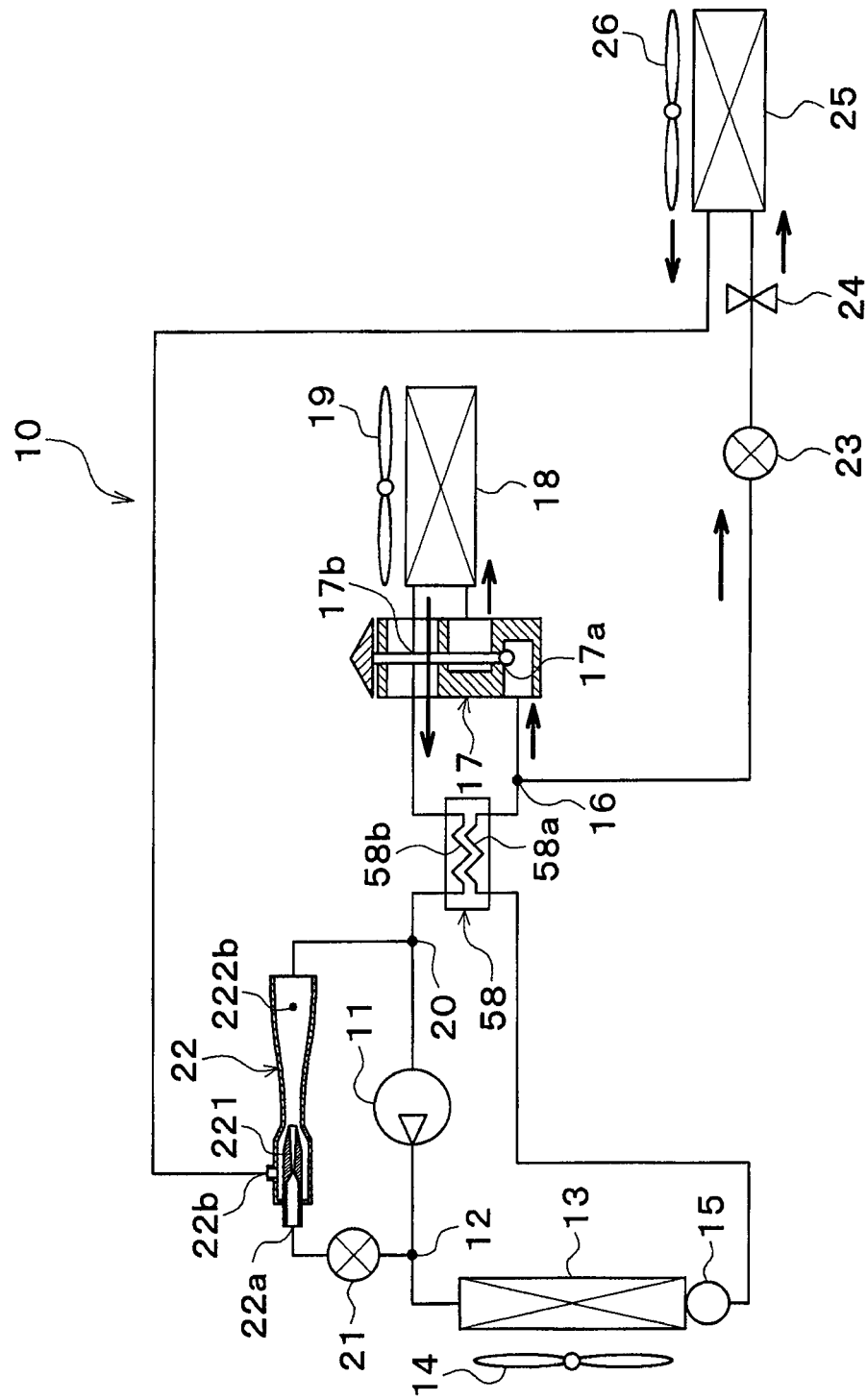
FIG. 8 is a diagram schematically illustrating an overall configuration of a refrigeration cycle device in a fifth embodiment.
Figure 9:
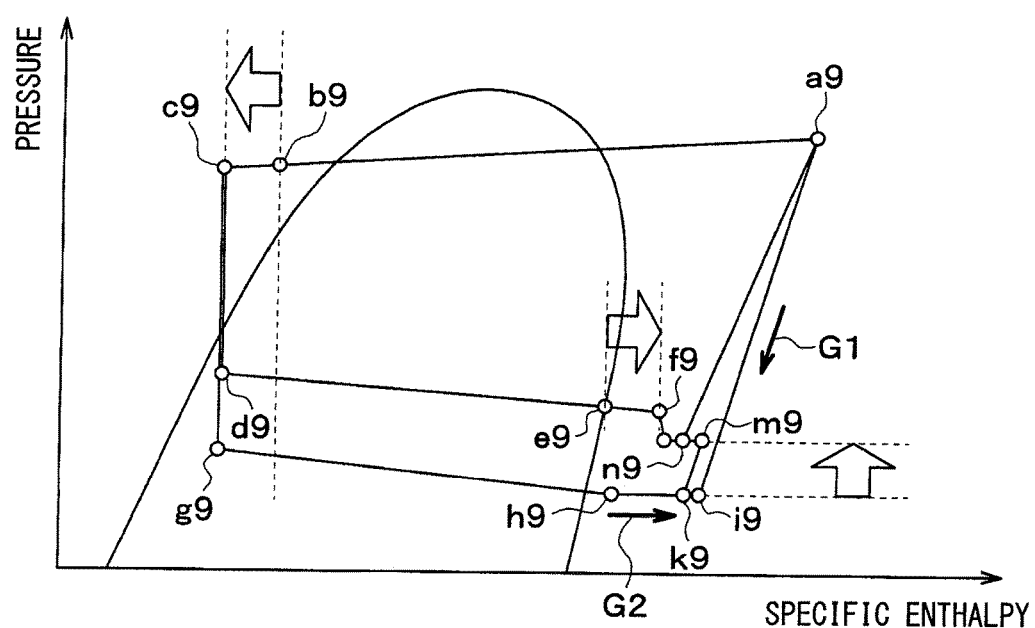
FIG. 9 is a Mollier diagram showing states of the refrigerant circulating in the refrigeration cycle device during the air-conditioning and refrigerating operation in the fifth embodiment.
Figure 10:
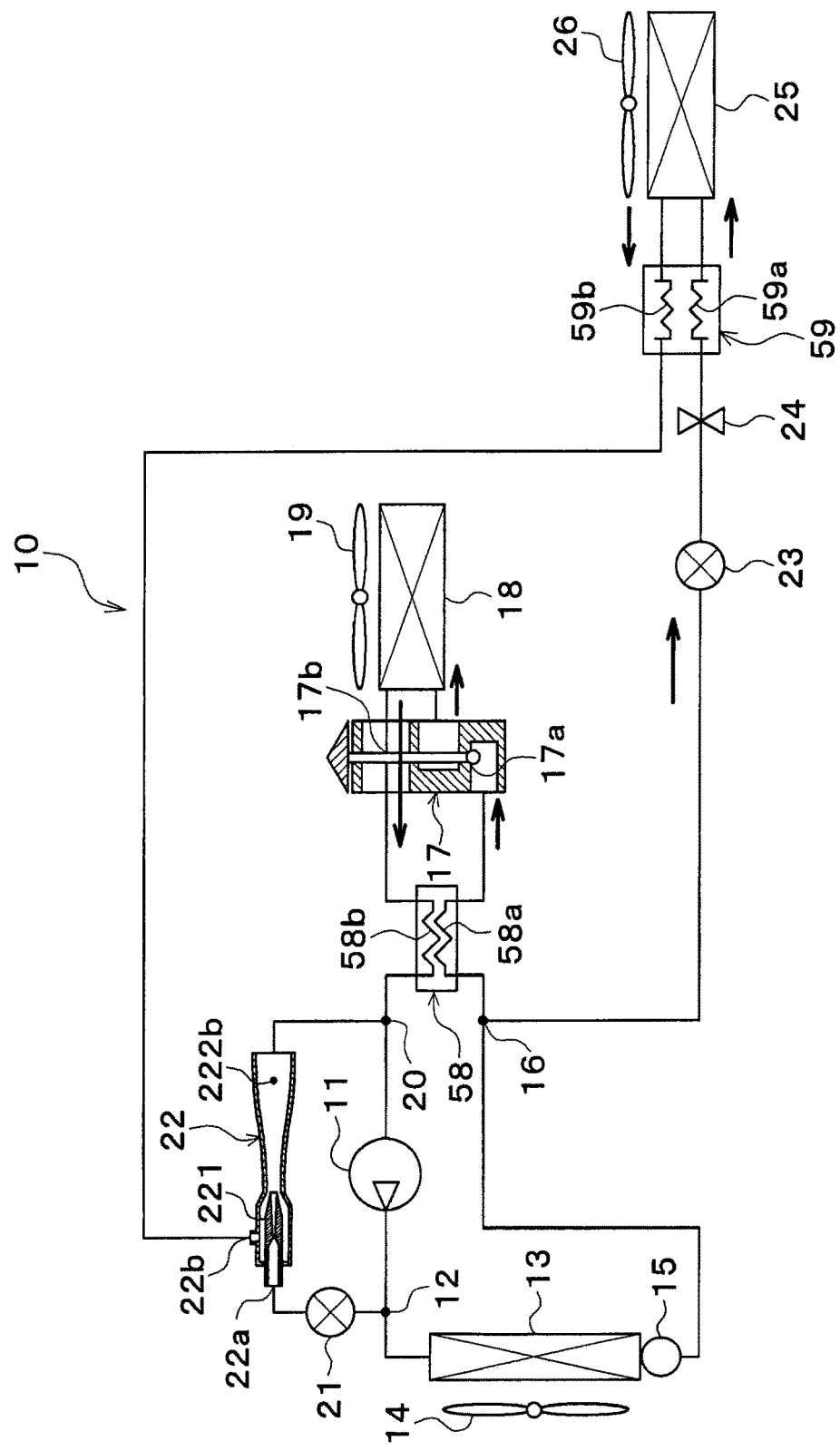
FIG. 10 is a diagram schematically illustrating an overall configuration of a refrigeration cycle device in a sixth embodiment.

As shown in FIG. 8 and FIG. 9, a fifth embodiment is different from the above-described first embodiment in a point that the refrigeration cycle device 10 in the present embodiment further includes an internal heat exchanger 58.

The internal heat exchanger 58 includes a high-pressure refrigerant path 58a and a low-pressure refrigerant path 58b. The high-pressure refrigerant path 58a is positioned between the reservoir 15 and the second branch portion 16. The low-pressure refrigerant path 58b is positioned between the thermosensitive path 17b of the expansion valve 17 and the merging part 20.

The internal heat exchanger 58 is a heat exchanger that performs a heat exchange between the refrigerant at a high pressure flowing through the high-pressure refrigerant path 58a and a refrigerant at a low pressure flowing through the low-pressure refrigerant path 58b as described hereafter.

Similar to the above-described embodiments, the controller operates the compressor 11, the exterior blower 14, the interior blower 19 and the refrigerator blower 26 and opens the first switching valve 21 and the second switching valve 23 in the air-conditioning and refrigerating operation.

As such, in the air-conditioning and refrigerating operation, as shown in FIG. 9, the compressor 11 discharges the refrigerant at a high temperature and a high pressure (at point a9 in FIG. 9), and the first branch portion 12 divides a flow of the refrigerant at the high temperature and the high pressure into the one flow flowing toward the radiator 13 and the other flow flowing toward the nozzle inlet 22a of the ejector 22.

The refrigerant of the one flow divided in the first branch portion 12 flows into the radiator 13 and radiates heat in the radiator 13 by exchanging heat with the outside air discharged from the exterior blower 14. As a result, the refrigerant of the one flow divided in the first branch portion 12 is condensed (from point a9 to point b9 in FIG. 9).

The refrigerant after radiating heat in the radiator 13 flows into the high-pressure refrigerant path 58a of the internal heat exchanger 58 and exchanges heat with the refrigerant flowing through the low-pressure refrigerant path 58b of the internal heat exchanger 58 (from point b9 to point c9 in FIG. 9).

The refrigerant after exchanging heat in the high-pressure refrigerant path 58a flows into the second branch portion 16. The second branch portion 16 divides a flow of the refrigerant into one flow flowing toward the expansion valve 17 and an other flow flowing toward the fixed throttle 24. The refrigerant of the one flow divided in the second branch portion 16 flows into the decompression path 17a of the expansion valve 17 and is decompressed isenthalpically in the expansion valve 17 (from point c9 to point d9 in FIG. 9).

The refrigerant decompressed in the decompression path 17a of the expansion valve 17 flows into the cooling evaporator 18 and is evaporated in the cooling evaporator 18 by absorbing heat from the air discharged from the interior blower 19 (from point d9 to point e9 in FIG. 9).

The refrigerant after being evaporated in the cooling evaporator 18 flows into the low-pressure refrigerant path 58b of the internal heat exchanger 58 and exchanges heat with the refrigerant at the high pressure flowing through the high-pressure refrigerant path 58a (from point e9 to point f9 in FIG. 9).

The refrigerant of the other flow divided in the second branch portion 16 flows into the fixed throttle 24 and is decompressed isenthalpically in the fixed throttle 24 (from point c9 to point g9 in FIG. 9).

The refrigerant after decompressed in the fixed throttle 24 flows into the refrigerator evaporator 25 and is evaporated in the refrigerator evaporator 25 by absorbing heat from air discharged from the refrigerator blower 26 (from point g9 to point h9 in FIG. 9).

The refrigerant of the other flow divided in the first branch portion 12 flows into the nozzle 221 of the ejector 22 from the nozzle inlet 22a, is decompressed in the nozzle 221 isentropically, and then is injected from the refrigerant injection port 221b as an injection refrigerant (from point a9 to point i9 in FIG. 9).

The refrigerant flowing out of the refrigerator evaporator 25 is drawn into the ejector 22 from the refrigerant suction port 22b as a suction refrigerant by suction force of the injection refrigerant injected from the refrigerant injection port 221b. Both of the injection refrigerant from the refrigerant injection port 221b and the suction refrigerant from the refrigerant suction port 22b flow into the diffuser portion 222b (from point h9 to point k9 and from point i9 to point k9 in FIG. 9).

Since the diffuser portion 222b increases the passage cross-sectional area thereof, kinetic energy of the refrigerant is converted into pressure energy. As such, the diffuser portion 222b mixes the injection refrigerant from the refrigerant injection port 221b and the suction refrigerant from the refrigerant suction port 22b to be a mixed refrigerant and increases a pressure of the mixed refrigerant (from point k9 to point m9 in FIG. 9).

The mixed refrigerant flowing out of the diffuser portion 222b and the refrigerant flowing out of the low-pressure refrigerant path 58b of the internal heat exchanger 58 are collected in the merging part 20. Subsequently, the collected refrigerant flows into the compressor 11 from the suction port and is compressed again (from point m9 to point n9 and from point f9 to point n9 in FIG. 9).

The refrigeration cycle device 10 in the present embodiment is operated as described above in the air-conditioning and refrigerating operation similar to the above-described first embodiment. As a result, the refrigeration cycle device 10 can cool air flowing toward the passenger cabin while cooling air in the refrigerator.

Moreover, in the present embodiment, the internal heat exchanger 58 performs the heat exchange between the refrigerant at the high pressure flowing through the high-pressure refrigerant path 58a and the refrigerant at the low pressure flowing through the low-pressure refrigerant path 58b. As such, an enthalpy difference in each of the cooling evaporator 18 and the refrigerator evaporator 25 is increased. As a result, coefficient of performance (COP) of the refrigeration circuit can be improved.

By increasing the enthalpy difference in the refrigerator evaporator 25, a flow rate of refrigerant is reduced. Therefore, a flow ratio G2/G1 in the ejector 22 can be decreased, and a degree of increase in a pressure of the refrigerant in the diffuser portion 222b can be increased.

The flow ratio G2/G1 is defined as a ratio obtained by dividing a volume G2 of the refrigerant drawn into the ejector 22 from the refrigerant suction port 22b by a volume G1 of the refrigerant flowing into the nozzle 221 of the ejector 22.

In the air-conditioning operation, the controller operates the compressor 11, the exterior blower 14 and the interior blower 19 and closes the first switching valve 21 and the second switching valve 23 so that the compressor 11 discharges the refrigerant at the high temperature and the high pressure. The refrigerant at the high temperature and the high pressure flows into the radiator 13 and radiates heat in the radiator 13 by exchanging heat with the outside air discharged from the exterior blower 14. As such, the refrigerant at the high temperature and the high pressure is condensed in the radiator 13.

The refrigerant flowing out of the radiator 13 flows into the high-pressure refrigerant path 58a of the internal heat exchanger 58 and exchanges heat with the refrigerant flowing through the low-pressure refrigerant path 58b of the internal heat exchanger 58.

The refrigerant flowing out of the high-pressure refrigerant path 58a of the internal heat exchanger 58 flows into the decompression path 17a of the expansion valve 17 and is decompressed isenthalpically in the decompression path 17a.

The refrigerant, after decompressed in the decompression path 17a of the expansion valve 17, flows into the cooling evaporator 18 and is evaporated in the cooling evaporator 18 by absorbing heat from air discharged from the interior blower 19.

The refrigerant flowing out of the cooling evaporator 18 flows into the low-pressure refrigerant path 58b of the internal heat exchanger 58 and exchanges heat with the refrigerant at the high pressure flowing through the high-pressure refrigerant path 58a of the internal heat exchanger 58. The refrigerant flowing out of the low-pressure refrigerant path 58b of the internal heat exchanger 58 is drawn into the compressor 11 from the suction port and is compressed again.

The refrigeration cycle device 10 in the present embodiment is operated as described above in the air-conditioning operation, thereby cooling the air flowing toward the passenger cabin.

In the air-conditioning operation, an enthalpy difference is increased in the cooling evaporator 18 due to the heat exchange in the internal heat exchanger 58 between the refrigerant at the high pressure flowing through the high-pressure refrigerant path 58a and the refrigerant at the low pressure flowing through the low-pressure refrigerant path 58b. As such, coefficient of performance (COP) of the refrigeration circuit can be improved.

In the present embodiment, the internal heat exchanger 58 performs a heat exchange between refrigerant flowing into the expansion valve 17 and refrigerant flowing out of the cooling evaporator 18. As such, coefficient of performance (COP) of the refrigeration circuit can be improved by increasing the enthalpy difference.

In the present embodiment, the high-pressure refrigerant path 58a of the internal heat exchanger 58 is located upstream of the second branch portion 16 in the flow direction of refrigerant, and the low-pressure refrigerant path 58b of the internal heat exchanger 58 is located upstream of the merging part 20 in the flow direction of refrigerant.

As such, in the air-conditioning refrigerating operation, an enthalpy difference in the refrigerator evaporator 25 is increased. As a result, the flow rate of the refrigerant can be reduced. Therefore, the flow ratio G2/G1 in the ejector 22 can be decreased, and the degree of increase in pressure of the refrigerant in the diffuser portion 222b can be increased.

Sixth Embodiment

Although the second branch portion 16 is located downstream of the high-pressure refrigerant path 58a in the fifth embodiment, the second branch portion 16 is located upstream of the high-pressure refrigerant path 58a in the present embodiment.

In addition, the refrigeration cycle device 10 in a sixth embodiment further has a refrigerator internal heat exchanger 59 as compared to the refrigeration cycle device 10 of the fifth embodiment.

The refrigerator internal heat exchanger 59 includes a high-pressure refrigerant path 59a and a low-pressure refrigerant path 59b. The high-pressure refrigerant path 59a is located between the fixed throttle 24 and the refrigerator evaporator 25. The low-pressure refrigerant path 59b is located between the refrigerator evaporator 25 and the refrigerant suction port 22b of the ejector 22.

In the present embodiment, the refrigerant of the one flow divided in the second branch portion 16 flows through the high-pressure refrigerant path 58a. An outlet of the high-pressure refrigerant path 58a is connected to the inlet of the decompression path 17a of the expansion valve 17. The outlet of the decompression path 17a is connected to the refrigerant inlet of the cooling evaporator 18. The refrigerant outlet of the cooling evaporator 18 is connected to the inlet of the thermosensitive path 17b of the expansion valve. The outlet of the thermosensitive path 17b is connected to an inlet of the low-pressure refrigerant path 58b of the internal heat exchanger 58. As such, the refrigerant at the low pressure decompressed in the expansion valve 17 flows into the low-pressure refrigerant path 58b.

Thus, the internal heat exchanger 58 performs the heat exchange between the refrigerant at the high pressure flowing from the compressor 11 and flowing through the high-pressure refrigerant path 58a and the refrigerant at the low pressure decompressed in the expansion valve 17 and flowing through the low-pressure refrigerant path 58b. As such, an enthalpy difference in the cooling evaporator 18 is increased. As a result, coefficient of performance (COP) of the refrigeration circuit can be improved.

Similar to the above-described embodiments, the refrigerant of the other flow divided in the second branch portion 16 flows through the second switching valve 23 and the fixed throttle 24 in this order. The outlet of the fixed throttle 24 is connected to an inlet of the high-pressure refrigerant path 59a, and an outlet of the high-pressure refrigerant path 59a is connected to the refrigerant inlet of the refrigerator evaporator 25. As such, the refrigerant after passing through the high-pressure refrigerant path 59a flows into the refrigerator evaporator 25.

The refrigerant outlet of the refrigerator evaporator 25 is connected to an inlet of the low-pressure refrigerant path 59b. As such, the refrigerant evaporated in the refrigerator evaporator 25 flows into the low-pressure refrigerant path 59b.

Thus, the refrigerator internal heat exchanger 59 performs the heat exchange between the refrigerant before passing through the refrigerator evaporator 25 and flowing through the high-pressure refrigerant path 59a and the refrigerant after passing through the refrigerator evaporator 25 and flowing through the low-pressure refrigerant path 59b.

In other words, the refrigerator internal heat exchanger 59 performs a heat exchange between the refrigerant at a high pressure flowing through the high-pressure refrigerant path 59a and a refrigerant at a low pressure flowing through the low-pressure refrigerant path 59b.

Since the refrigerator internal heat exchanger 59 performs the heat exchange, an enthalpy difference in the refrigerator evaporator 25 is increased in the air-conditioning and refrigerating operation. As a result, coefficient of performance (COP) of the refrigeration circuit can be improved.

Since a flow rate of the refrigerant can be reduced by increasing an enthalpy difference in the refrigerator evaporator 25, the flow ratio G2/G1 in the ejector 22 can be decreased. Therefore, the degree of increase in pressure of the refrigerant in the diffuser portion 222b can be increased.

Seventh Embodiment

A seventh embodiment is different from the fourth embodiment in that a freezer evaporator 60 serving as the second evaporator replaces the refrigerator evaporator 25 and that a refrigerator evaporator 62 serving as the third evaporator replaces the second cooling evaporator 54.

Figure 11:
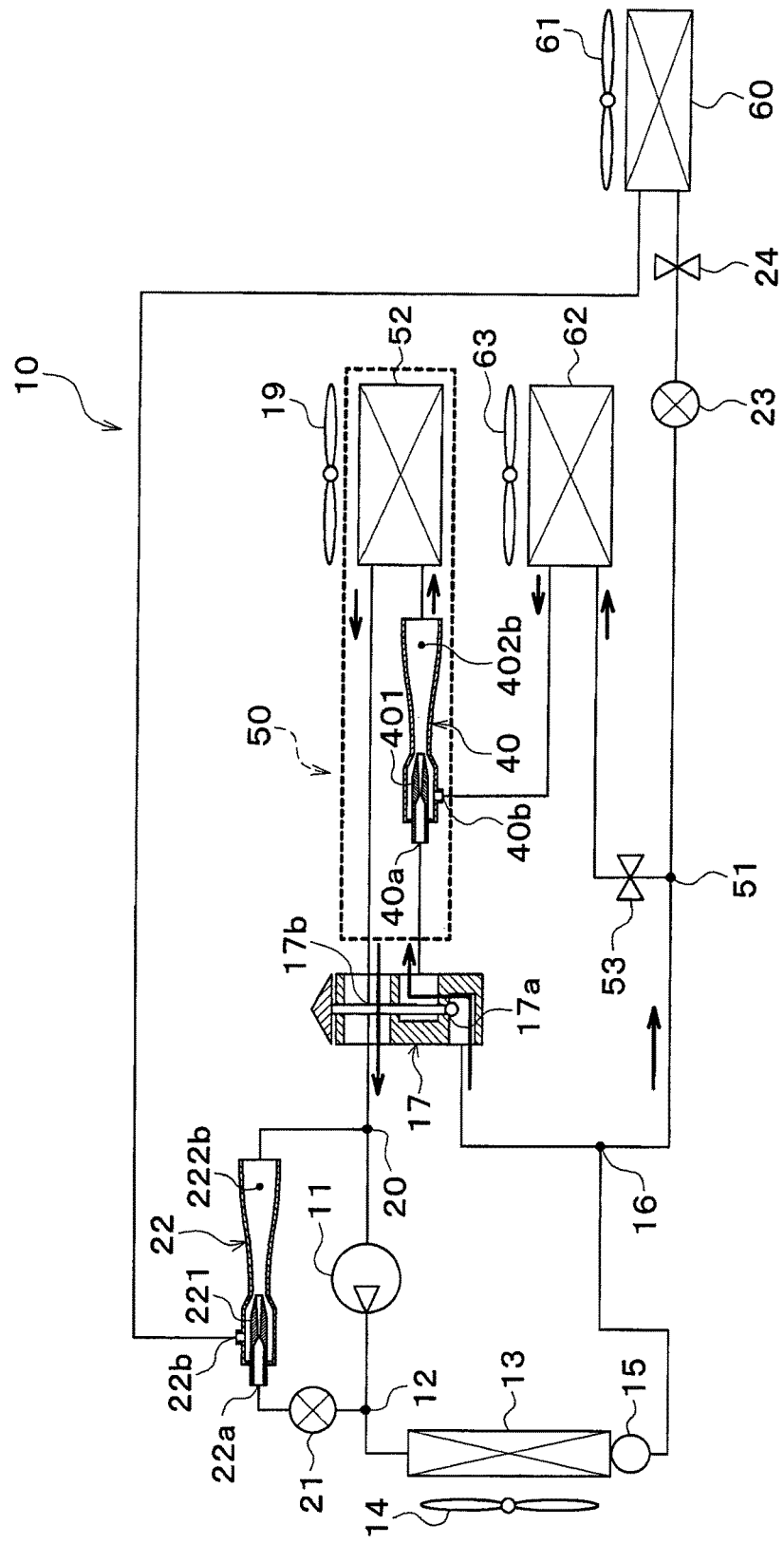
FIG. 11 is a diagram schematically illustrating an overall configuration of a refrigeration cycle device in a seventh embodiment.

In the above-described fourth embodiment, the refrigerant inlet port of the third branch portion 51 is connected to the refrigerant outlet of the decompression path 17a of the expansion valve 17. However, in the present embodiment, as shown in FIG. 11, the refrigerant inlet port of the third branch portion 51 is connected to the second refrigerant outlet port of the second branch portion 16 connected to the second switching valve 23.

The evaporator unit 50 in the seventh embodiment is different from the evaporator unit 50 in the fourth embodiment in that the second cooling evaporator 54 is omitted. However, the evaporator unit 50 in the seventh embodiment includes the second ejector 40 and the cooling evaporator 52 and evaporates the refrigerant after decompressed in the decompression path 17a of the expansion valve 17 to cool the air flowing toward the passenger cabin similar to the fourth embodiment.

The freezer evaporator 60 is connected to the first ejector 22 and the refrigerator evaporator 62 is connected to the second ejector.

The third branch portion 51 divides the refrigerant of the other flow divided in the second branch portion 16 in to one flow flowing to the refrigerator evaporator 62 and an other flow flowing to the freezer evaporator 60.

The refrigerant of the one flow divided in the third branch portion 51 flows into the second ejector 40 via the second fixed throttle 53 and the refrigerator evaporator 62. Specifically, the refrigerant of the one flow divided in the third branch portion 51 flows into the second fixed throttle. The second fixed throttle 53 decompresses the refrigerant from the first refrigerant outlet of the third branch portion 51 to be the refrigerant at the low pressure. The refrigerator evaporator 62 takes in the refrigerant at the low pressure and evaporates the refrigerant decompressed in the second fixed throttle 53.

The refrigerator evaporator 62 is a heat-absorbing heat exchanger and evaporates the refrigerant at the low pressure flowing from the second fixed throttle 53. Specifically, the refrigerator evaporator 62 performs a heat exchange between the refrigerant at the low pressure from the second fixed throttle 53 and air in a refrigerator (not shown). The low-refrigerant from the second fixed throttle 53 absorbs heat from the air and is evaporated during the heat exchange. As a result, the refrigerator evaporator 62 cools the air in the refrigerator by absorbing heat from the air using the refrigerant at the low pressure.

In the present embodiment, a refrigerator blower 63 discharges the air toward the refrigerator evaporator 62. The refrigerator blower 63 is an electric blower of which rotational speed (i.e., a volume of air discharged from the electric blower) is controlled based on a control voltage output from the controller (not shown).

A refrigerant outlet of the refrigerator evaporator 62 is connected to the second refrigerant suction port 40b of the second ejector 40. The second refrigerant suction port 40b draws the refrigerant evaporated in the refrigerator evaporator 62 as a suction refrigerant (i.e., a second suction refrigerant).

The second nozzle 401 of the second ejector 40 decompresses refrigerant, which flows from the expansion valve 17 after decompressed in the expansion valve 17, and injects the decompressed refrigerant as an injection refrigerant (i.e., a second injection refrigerant). The second diffuser portion 402b mixes the second injection refrigerant from the second nozzle 401 and the second suction refrigerant form the second refrigerant suction port 40b to be a second mixed refrigerant and increases a pressure of the second mixed refrigerant.

The cooling evaporator 52 evaporates the second mixed refrigerant flowing from the second diffuser portion 402b of the second ejector 40.

Thus, the evaporator unit 50 cools the air flowing toward the passenger cabin using the refrigerant decompressed in the decompression path 17a of the expansion valve 17 and the refrigerant evaporated in the refrigerator evaporator 62.

The second refrigerant outlet port of the third branch portion 51 is connected to the freezer evaporator 60 via the second switching valve 23 and the fixed throttle 24. As such, the refrigerant of the other flow divided in the third branch portion 51 flows into the fixed throttle 24. The fixed throttle 24 decompresses the pressure of the other flow divided in the third branch portion 51 to be the refrigerant at the low pressure. The freezer evaporator 60 takes in and evaporates the refrigerant at the low pressure decompressed in the fixed throttle 24.

The freezer evaporator 60 is a heat-absorbing heat exchanger and evaporates the refrigerant at the low pressure flowing from the fixed throttle 24. Specifically, the freezer evaporator 60 performs a heat exchange between the refrigerant at the low pressure from the fixed throttle 24 and air in a freezer (not shown). The low-refrigerant from the fixed throttle 24 absorbs heat from the air and is evaporated during the heat exchange. As a result, the freezer evaporator 60 cools the air in the freezer by absorbing heat from the air using the refrigerant at the low pressure.

In the present embodiment, a freezer blower 61 discharges the air toward the freezer evaporator 60. The freezer blower 61 is an electric blower of which rotational speed (i.e., a volume of air discharged from the electric blower) is controlled based on a control voltage output from the controller (not shown).

The refrigerant outlet of the freezer evaporator 60 is connected to the refrigerant suction port 22b of the ejector 22 and discharges the evaporated refrigerant toward the refrigerant suction port 22b of the first ejector 22.

A pressure zone (i.e., a temperature zone) of the refrigerator evaporator 62 with respect to the cooling evaporator 52 is determined based on the degree of increase in pressure of the refrigerant in the first ejector 22. Similarly, a pressure zone (i.e., a temperature zone) of the freezer evaporator 60 with respect to the cooling evaporator 52 is determined based on the degree of increase in pressure of the refrigerant in the second ejector 40. As such, by adjusting flow rates of the refrigerant flowing through the cooling evaporator 52, the refrigerator evaporator 62 and the freezer evaporator 60 respectively, the temperature zones in the cooling evaporator 52, the refrigerator evaporator 62 and the freezer evaporator 60 can be different from each other. Thus, three temperature zones can be obtained.

Specifically, the gas refrigerant flows into the nozzle 221 of the first ejector 22. As such, the degree of increase in pressure of the refrigerant can be increased easily in the first ejector 22. Therefore, the temperature zone of the freezer evaporator 60 can be lower than the temperature zone of the refrigerator evaporator 62.

As a result, all of the cooling operation, the refrigerating operation, and the freezing operation can be performed only by the refrigeration cycle device 10.

The fixed throttle 24 decompresses the refrigerant of the other flow divided in the third branch portion 51. The refrigerant decompressed in the fixed throttle 24 flows into the freezer evaporator 60 and is evaporated in the freezer evaporator 60. The evaporated refrigerant evaporated in the freezer evaporator 60 is drawn into the first ejector 22 from the refrigerant suction port 22b.

According to the above-described configuration, the three different temperature zones can be obtained in the cooling evaporator 52, the refrigerator evaporator 62, and the freezer evaporator 60 respectively.

In the present embodiment, the cooling evaporator 52 evaporates the refrigerant after a pressure of which is increased in the second diffuser portion 402b of the second ejector 40 by allowing the refrigerant to absorb heat from the air flowing toward the passenger cabin. Therefore, the temperature zone of the cooling evaporator 52 can be higher than the temperature zone of the refrigerator evaporator 62.

Eighth Embodiment

Figure 12:
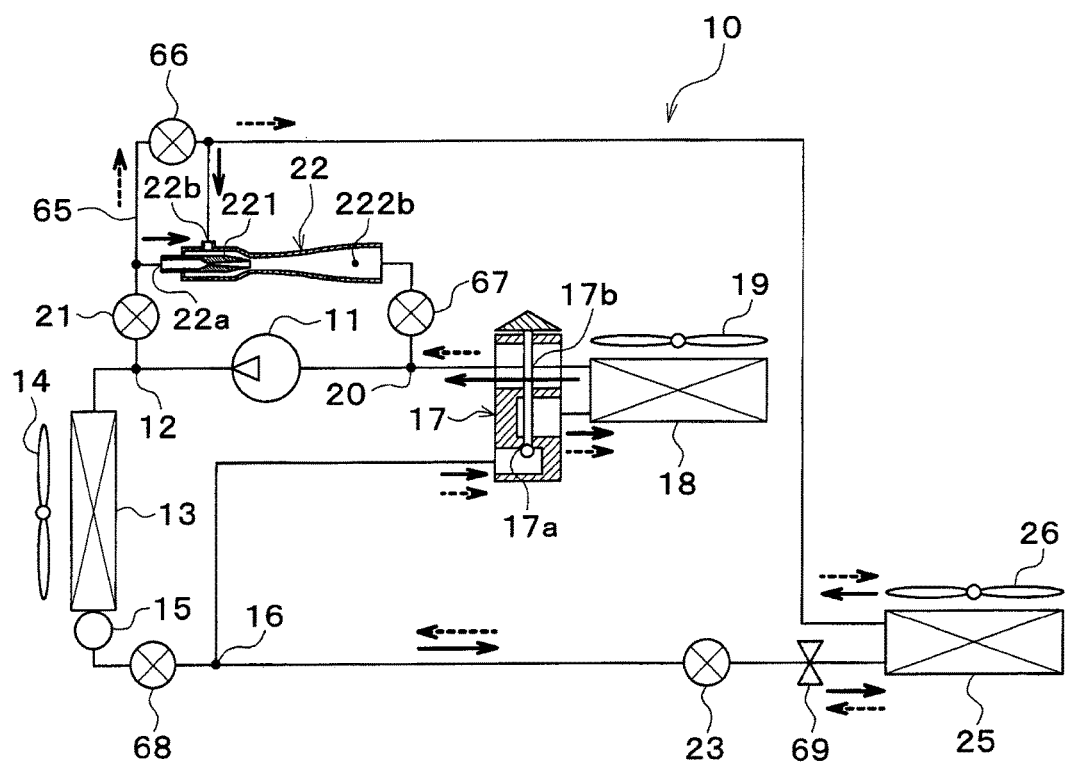
FIG. 12 is a diagram schematically illustrating an overall configuration of a refrigeration cycle device in an eighth embodiment.

As shown in FIG. 12, the refrigeration cycle device 10 in the present embodiment further includes an ejector bypass path 65, an ejector-bypass-path switching valve 66, an ejector outlet switching valve 67, and a radiator switching valve 68 as compared to the first embodiment.

In the present embodiment, a branch portion divides a flow of the refrigerant after passing through the first switching valve 21 into one flow flowing into the ejector 22 from the nozzle inlet 22a and an other flow flowing into the refrigerant suction port 22b via the ejector-bypass-path switching valve 66. The ejector bypass path 65 is a bypass passage that takes in the refrigerant of the other flow divided in the branch portion and that guides the refrigerant to flow into the refrigerant suction port 22b. In other words, the ejector bypass path 65 guides the refrigerant to flow into the refrigerant suction port 22b without flowing into the nozzle 221 of the ejector 22.

The ejector-bypass-path switching valve 66 is a refrigerant passage switching valve that opens and closes the ejector bypass path 65.

The ejector outlet switching valve 67 is a refrigerant passage switching valve that opens and closes a refrigerant path extending between the diffuser portion 222b of the ejector 22 and the merging part 20.

The radiator switching valve 68 is a refrigerant passage switching valve that opens and closes a refrigerant path extending between the reservoir 15 and the second branch portion 16.

A throttle 69 configured to be fully open replaces the fixed throttle 24 of the above-described first embodiment. The throttle 69 is located between the second switching valve 23 and the refrigerator evaporator 25. The throttle 69 switches between a state where the throttle 69 fully decompresses the liquid refrigerant flowing from the reservoir 15 and a state where the throttle 69 does not decompress the liquid refrigerant flowing form the reservoir 15. The throttle 69 serves as the second decompressor.

As an example, the throttle 69 may be a variable throttle of which throttle degree varies. As an example, the throttle 69 may include a fixed throttle and a bypass mechanism. The fixed throttle has a fixed throttle degree that is not variable. The bypass mechanism switches a state where refrigerant flows through the fixed throttle and a state where refrigerant flows while bypassing the fixed throttle.

In the air-conditioning and refrigerating operation, the controller opens the first switching valve 21, the second switching valve 23, the ejector outlet switching valve 67, and the radiator switching valve 68, closes the ejector-bypass-path switching valve 66, and sets the throttle degree of the throttle 69 to a normal degree. As such, refrigerant flows as shown by solid indication arrows in FIG. 12, i.e., flows as in the air-conditioning and refrigerating operation in the above-described first embodiment. Therefore, both of the air flowing toward the passenger cabin and the air in the refrigerator can be cooled.

In a defrosting operation and a heating operation for heating the refrigerator, the controller opens the first switching valve 21, the second switching valve 23, the ejector-bypass-path switching valve 66, and closes the ejector outlet switching valve 67 and the radiator switching valve 68, closes the ejector-bypass-path switching valve 66, and fully opens the throttle 69. As such, the refrigerant flows as shown by dashed indicator arrows in FIG. 12. That is, the refrigerant at the high pressure discharged from the compressor 11 flows through the refrigerator evaporator 25 while bypassing the ejector 22 and radiates heat in the refrigerator evaporator 25. The refrigerant flowing out of the refrigerator evaporator 25 flows through the decompression path 17a of the expansion valve 17 and the cooling evaporator 18, and then is drawn into the compressor 11. A flow of the refrigerant flowing into the radiator 13 is shut off by closing the radiator switching valve 68.

As described above, the refrigerant at the high-pressure and the high-temperature from the compressor 11 flows through the refrigerator evaporator 25 in the defrosting operation and the heating operation for the refrigerator. Therefore, when the refrigerator evaporator 25 is frosted, the refrigerator evaporator 25 can be defrosted by performing the defrosting operation. In addition, the heating operation for the refrigerator in which the air in the refrigerator is heated by the refrigerator evaporator 25 can be performed as well. That is, the refrigerator can be used as a keep-warm container.

In each of the defrosting operation and the heating operation for the refrigerator, the cooling evaporator 18 can cool the air flowing toward the passenger cabin.

In the present embodiment, the ejector bypass path 65 guides a part of the refrigerant of the other flow divided in the first branch portion 12 to flow to the refrigerant suction port 22*b* of the ejector 22 without flowing into the nozzle 221 of the ejector 22. The ejector-bypass-path switching valve 66 opens and closes the ejector bypass path 65. The ejector outlet switching valve 67 opens and closes the refrigerant path extending between the diffuser portion 222*b* of the ejector 22 and the merging part 20.

According to the above-described configuration, the defrosting operation for defrosting the refrigerator evaporator 25 and the heating operation for heating the air in the refrigerator by the refrigerator evaporator 25 can be performed.

Ninth Embodiment

Figure 13:
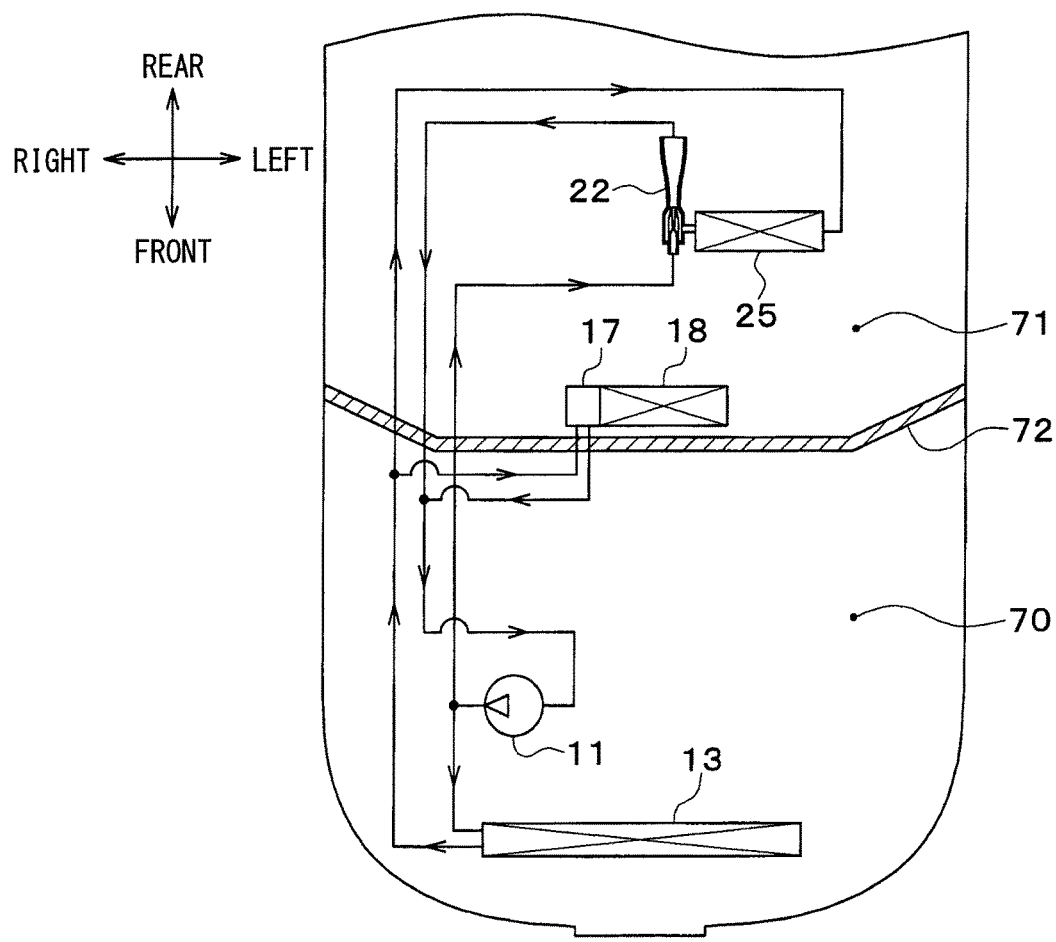
FIG. 13 is a diagram schematically illustrating an overall configuration of a refrigeration cycle device mounted to a vehicle in a ninth embodiment.

As shown in FIG. 13, in the present embodiment, the ejector 22 described in the above-described first embodiment is arranged near the refrigerator evaporator 25. In FIG. 13, indicator arrows indicating front, rear, left and right indicate a front-rear direction and a left-right direction with the refrigeration cycle device 10 mounted to a vehicle.

The compressor 11 and the radiator 13 are disposed in an engine room 70. The cooling evaporator 18, the ejector 22 and the refrigerator evaporator 25 are disposed inside a passenger cabin 71. The engine room 70 and the passenger cabin 71 are partitioned from each other by a partition wall 72.

The ejector 22 is fixed to the refrigerator evaporator 25 directly. Specifically, the refrigerant suction port 22*b* (see FIG. 1) of the ejector 22 is connected to the refrigerant outlet of the refrigerator evaporator 25 directly. As such, a connecting structure for connecting the ejector 22 and the refrigerator evaporator 25 can be simplified, and mountability and ease of assembling can be improved.

In the present embodiment, a length of a refrigeration path extending between the refrigerant suction port 22*b* of the ejector 22 and the refrigerant outlet of the refrigerator evaporator 25 is shorter than a length of a refrigeration path extending between the nozzle inlet 22*a* (see FIG. 1) of the ejector 22 and the discharge port of the compressor 11.

That is, a refrigerant pipe connecting the refrigerant suction port 22*b* of the ejector 22 and the refrigerator evaporator 25 can be short. As such, a pressure loss of the refrigerant can be reduced. When refrigerant flowing through the refrigerant pipe connecting the refrigerant suction port 22*b* of the ejector 22 and the refrigerator evaporator 25 absorbs heat from ambient air, a superheat degree of the refrigerant would be increased. However, the length of the refrigerant pipe can be short in the present embodiment. As such, a cause of increase in the superheat degree can be suppressed. As a result, a performance of the refrigerator evaporator 25 can be improved.

Tenth Embodiment

Figure 14:
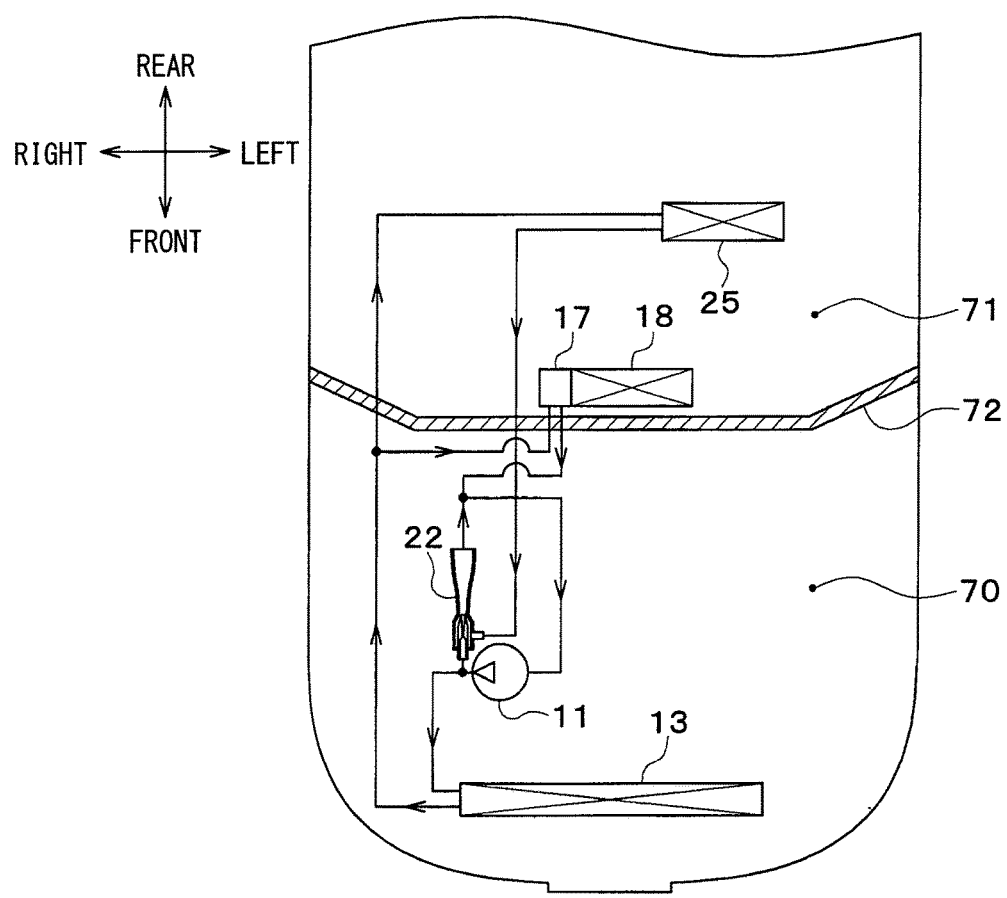
FIG. 14 is a diagram schematically illustrating an overall configuration of a refrigeration cycle device mounted to a vehicle in a tenth embodiment.

In the above-described ninth embodiment, the ejector 22 is arranged near the refrigerator evaporator 25. However, in the present embodiment, the ejector 22 is arranged near the compressor 11 as shown in FIG. 14. In FIG. 14, indicator arrows indicating front, rear, left and right indicate a front-rear direction and a left-right direction with the refrigeration cycle device 10 mounted to a vehicle.

The compressor 11, the radiator 13 and the ejector 22 are disposed in the engine room 70. The cooling evaporator 18 and the refrigerator evaporator 25 are disposed inside the passenger cabin 71.

Since the ejector 22 is disposed in the engine room 70, noise caused by refrigerant flowing through the ejector 22, i.e., pass-by noise, is hardly transmitted into the passenger cabin 71. As such, a cause of the pass-by noise can be suppressed without disposing a sound insulation member or a sound absorbing member.

The ejector 22 is fixed to the compressor 11. Specifically, the nozzle inlet 22*a* (see FIG. 1) of the ejector 22 is directly connected to the refrigerant outlet of the first switching valve 21 (see FIG. 1). The refrigerant inlet of the first switching valve 21 is directly connected to the second refrigerant outlet port of the first branch portion 12 (see FIG. 1). The first refrigerant outlet port is one of the two refrigerant outlet ports of the first branch portion 12. The refrigerant inlet port of the first branch portion 12 is directly connected to the discharge port of the compressor 11. As such, a connecting structure for connecting the ejector 22 and the compressor 11 can be simplified, and mountability and ease of assembling can be improved.

The merging part 20 includes the one refrigerant outlet port and the two refrigerant inlet ports, i.e., the first and second refrigerant inlet ports (see FIG. 1). The second refrigerant inlet port of the merging part 20 is directly connected to the refrigerant outlet of the diffuser portion 222*b* of the ejector 22 (see FIG. 1). The refrigerant outlet port of the merging part 20 is directly connected to the suction port of the compressor 11.

In the present embodiment, a length of a refrigeration path extending between the nozzle inlet 22*a* of the ejector 22 and the refrigerant discharge port of the compressor 11 is shorter than a length of a refrigeration path extending between the refrigerant suction port 22*b* of the ejector 22 and the refrigerant outlet of the refrigerator evaporator 25.

That is, a refrigerant pipe connecting the diffuser portion 222*b* of the ejector 22 and the compressor 11 can be short. As such, a pressure loss caused after increasing a pressure of the refrigerant can be reduced. As a result, a performance of the refrigerator evaporator 25 can be improved.

In addition, the refrigerant pipe connecting the nozzle inlet 22*a* of the ejector 22 and the compressor 11 can be short. Therefore, an amount of heat radiated from the refrigerant to ambient air in the refrigerant pipe connecting the refrigerant inlet port of the ejector 22 and the compressor 11 can be reduced. Thus, a loss of expansion energy can be reduced, and performance efficiency of the ejector 22 and a performance of the refrigerator evaporator 25 can be improved.

In addition, two refrigerant pipes of three refrigerant pipes connected to the ejector 22 can be shortened. As a result, the refrigeration cycle device 10 can be mounted to a vehicle easier.

Other Embodiments

The present disclosure is not limited to the above embodiments but can be modified as appropriate within the scope described in the present disclosure. Individual elements or features of a particular embodiment are generally not limited to that particular embodiment, but, where applicable, are interchangeable and can be used in a selected embodiment, even if not specifically shown or described. The constituent element(s) of each of the above embodiments is/are not necessarily essential unless it is specifically stated that the constituent element(s) is/are essential in the above embodiments, or unless the constituent element(s) is/are obviously essential in principle.

A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

(1) In the above-described embodiments, the refrigeration cycle device 10 includes the cooling evaporator 18 configured to cool air flowing toward the passenger cabin and the refrigerator evaporator 25 configured to cool air in the refrigerator. However, other evaporators may replace the cooling evaporator 18 and the refrigerator evaporator 25 to cool various fluids.

As an example, a front-seat cooling evaporator and a rear-seat cooling evaporator may replace the cooling evaporator 18 and the refrigerator evaporator 25 respectively. The front-seat cooling evaporator cools air flowing toward a front seat in the passenger cabin. The rear-seat cooling evaporator cools air flowing toward a rear seat in the passenger cabin.

(2) The refrigeration cycle device 10 described in the above-described embodiments is not limited to be adopted to an air conditioner for a vehicle. As an example, the refrigeration cycle device 10 may be used for various devices such as a stationary air conditioner or a freezing and refrigerating device.

(3) In the above-described embodiments, the ejector 22 and the second ejector 40 includes a fixed nozzle that includes a narrowest passage portion with fixed passage cross-sectional area. However, the ejector 22 and the second ejector 40 may include a variable nozzle that includes a narrowest passage of which passage cross-sectional area is variable.

As an example, a needle or a conical valve body is disposed in a passage defined in the variable nozzle. The needle or the conical valve body may be moved by an actuator such as an electric actuator to change the passage cross-sectional area of the narrowest passage.

(4) In the above-described embodiments, each of the fixed throttle 24, the bypass fixed throttle 45 and the second fixed throttle 53 is configured by a fixed throttle. However, each of the fixed throttle 24, the bypass fixed throttle 45 and the second fixed throttle 53 may be other variable throttle mechanisms such as a thermosensitive expansion valve or an electric expansion valve.

(5) In the above-described embodiments, the refrigerant is R1234yf or R134a as an example. However, other types of refrigerants such as R600a, R410A, R404A, R32, R1234yfxf, or R407C may be used. Alternatively, the refrigerant may be a mixture of two or more types of the refrigerants.

(6) In the above-described embodiments, the expansion valve 17 is a thermosensitive expansion valve. However, the expansion valve 17 may be an electric expansion valve or a fixed throttle.

The invention claimed is:

1. A refrigeration cycle device comprising:
a compressor configured to draw a refrigerant and to discharge the refrigerant after compressing the refrigerant;
a first branch portion configured to divide a flow of the refrigerant discharged from the compressor into one flow and an other flow of the refrigerant;
a radiator allowing the refrigerant of the one flow divided in the first branch portion to radiate heat in the radiator;
a second branch portion configured to divide a flow of the refrigerant, which flows from the radiator after radiating heat, into one flow and an other flow of the refrigerant;
a first decompressor configured to decompress the refrigerant of the one flow divided in the second branch portion;
a first evaporator allowing the refrigerant of the one flow, which flows from the first decompressor after being decompressed, to absorb heat and to be evaporated in the first evaporator;
a second decompressor configured to decompress the refrigerant of the other flow divided in the second branch portion;
a second evaporator allowing the refrigerant of the other flow, which flows from the second decompressor after being decompressed, to absorb heat and to be evaporated in the second evaporator;
an ejector including
a nozzle that is configured to decompress and inject the refrigerant of the other flow divided in the first branch portion, the nozzle injecting the refrigerant as a first injection refrigerant,
a refrigerant suction port that is configured to draw the refrigerant, which flows from the second evaporator after being evaporated, using suction force of the first injection refrigerant, the refrigerant suction port drawing the refrigerant as a first suction refrigerant, and
a pressure increasing portion that is configured to mix the first injection refrigerant and the first suction refrigerant to be a first mixed refrigerant and that is configured to increase a pressure of the first mixed refrigerant; and
a merging part configured to collect the refrigerant flowing out of the first evaporator and the first mixed refrigerant flowing out of the pressure increasing portion after the pressure of which is increased in the pressure increasing portion.

2. The refrigeration cycle device according to claim 1, further comprising:
a first passage switch configured to open and close a refrigerant path extending between the first branch portion and the nozzle; and
a second passage switch configured to open and close a refrigerant path extending between the second branch portion and the second decompressor.

3. The refrigeration cycle device according to claim 1, further comprising:
a third decompressor configured to decompress the refrigerant flowing from the radiator after radiating heat in the radiator; and
a third evaporator allowing the refrigerant, which flows from the third decompressor after being decompressed, to absorb heat and to be evaporated in the third evaporator.

4. The refrigeration cycle device according to claim 1, further comprising
a gas-liquid separator, wherein
the ejector is a first ejector,
the nozzle is a first nozzle,
the refrigerant suction port is a first refrigerant suction port,
the pressure increasing portion is a first pressure increasing portion,
the first decompressor is a second ejector,
the second ejector includes
a second nozzle that is configured to decompress and inject the refrigerant flowing from the radiator after radiating heat in the radiator, the second nozzle injecting the refrigerant as a second injection refrigerant,
a second refrigerant suction port that is configured to draw the refrigerant, which flows from the first evaporator after being evaporated in the first evaporator, using suction force of the second injection refrigerant, the second refrigerant suction port drawing the refrigerant as a second suction refrigerant, and
a second pressure increasing portion that is configured to mix the second injection refrigerant and the second suction refrigerant to be a second mixed refrigerant and that is configured to increase a pressure of the second mixed refrigerant; and
the gas-liquid separator is configured to
divide the second mixed refrigerant, which flows from the second pressure increasing portion after the pressure of which pressure is increased in the second pressure increasing portion, into a vapor refrigerant and liquid refrigerant,
allow the vapor refrigerant to flow to the compressor, and
allow the liquid refrigerant to flow to the first evaporator.

5. The refrigeration cycle device according to claim 1, further comprising:
a third branch portion configured to divide a flow of the refrigerant, which flows from the first decompressor after being decompressed in the first decompressor, into one flow and an other flow of the refrigerant;
a third decompressor configured to decompress the refrigerant of the one flow divided in the third branch portion;
a third evaporator allowing the refrigerant, which flows from the third decompressor after being decompressed in the third decompressor, to absorb heat and to be evaporated in the third evaporator; and
a second ejector including
a second nozzle that is configured to decompress and inject the refrigerant of the other flow divided in the third branch portion, the second nozzle injecting the refrigerant as a second injection refrigerant,
a second refrigerant suction port that is configured to draw the refrigerant, which flows from the third evaporator after being evaporated in the third evaporator, using suction force of the second injection refrigerant, the second refrigerant suction port drawing the refrigerant as a second suction refrigerant,
a second pressure increasing portion that is configured to mix the second injection refrigerant and the second suction refrigerant to be a second mixed refrigerant and that is configured to increase a pressure of the second mixed refrigerant, wherein
the ejector is a first ejector,
the nozzle is a first nozzle,
the refrigerant suction port is a first refrigerant suction port, and
the pressure increasing portion is a first pressure increasing portion.

6. The refrigeration cycle device according to claim 5, wherein
the first evaporator allows the refrigerant, which flows from the second pressure increasing portion after the pressure of which is increased in the second pressure increasing portion, to absorb heat and to be evaporated in the first evaporator.

7. The refrigeration cycle device according to claim 1, further comprising:
a third branch portion configured to divide a flow of the refrigerant, which flows from the radiator after radiating heat in the radiator, into one flow and an other flow of the refrigerant;
a third decompressor configured to decompress the refrigerant of the one flow divided in the third branch portion;
a third evaporator allowing the refrigerant, which flows from the third decompressor after being decompressed in the third decompressor, to absorb heat and to be evaporated in the third evaporator; and
a second ejector including
a second nozzle that is configured to decompress and inject the refrigerant, which flows from the first decompressor after being decompressed in the first decompressor, the second nozzle injecting the refrigerant as a second injection refrigerant,
a second refrigerant suction port that is configured to draw the refrigerant, which flows from the third evaporator after being evaporated in the third evaporator, using suction force of the second injection refrigerant, the second refrigerant suction port drawing the refrigerant as a second suction refrigerant, and
a second pressure increasing portion that is configured to mix the second injection refrigerant and the second suction refrigerant to be a second mixed refrigerant and that is configured to increase a pressure of the second mixed refrigerant, wherein
the ejector is a first ejector,
the nozzle is a first nozzle,
the refrigerant suction port is a first refrigerant suction port,
the pressure increasing portion is a first pressure increasing portion, and
the second decompressor is configured to decompress the refrigerant of the other flow divided in the third branch portion.

8. The refrigeration cycle device according to claim 1, further comprising
an internal heat exchanger that is configured to perform a heat exchange between the refrigerant flowing toward the first decompressor and the refrigerant flowing from the first evaporator.

9. The refrigeration cycle device according to claim 8, wherein
the internal heat exchanger includes
a high-pressure refrigerant path that allows the refrigerant flowing toward the first decompressor to flow therethrough and a low-pressure refrigerant path that allows the refrigerant flowing from the first evaporator to flow therethrough, the high-pressure refrigerant path is positioned upstream of the second branch portion in a flow direction of the refrigerant circulating in the refrigeration cycle device, and the low-pressure refrigerant path is positioned upstream of the merging part in the flow direction of the refrigerant.

10. The refrigeration cycle device according to claim 1, further comprising:

a bypass path configured to guide a part of the refrigerant of the other flow divided in the first branch portion and flowing toward the nozzle to flow to the refrigerant suction port;

a bypass switching valve configured to open and close the bypass path; and an ejector outlet switching valve configured to open and close a refrigerant path that extends between the pressure increasing portion and the merging part.

11. The refrigeration cycle device according to claim 1, wherein a length of a refrigerant path extending between the ejector and the compressor is shorter than a length of a refrigerant path extending between the ejector and the second evaporator.

12. The refrigeration cycle device according to claim 1, wherein a length of a refrigerant path extending between the ejector and the second evaporator is shorter than a length of a refrigerant path extending between the ejector and the compressor.

13. The refrigeration cycle device according to claim 1, wherein the ejector is fixed to the compressor.

14. The refrigeration cycle device according to claim 1, wherein the ejector is fixed to the second evaporator.

* * * * *